US012718273B2

(12) United States Patent
Vickers

(10) Patent No.: US 12,718,273 B2
(45) **Date of Patent: *Aug. 25, 2026**

(54) GRAPHICAL USER INTERFACE GENERATION SYSTEMS

(71) Applicant: Truist Bank, Charlotte, NC (US)

(72) Inventor: Lawrence Otis Vickers, Winter Garden, FL (US)

(73) Assignee: TRUIST BANK, Charlotte, NC (US)

(*) Notice: Subject to any disclaimer, the term of this patent is extended or adjusted under 35 U.S.C. 154(b) by 57 days.

This patent is subject to a terminal disclaimer.

(21) Appl. No.: 18/899,498

(22) Filed: Sep. 27, 2024

(65) Prior Publication Data

US 2025/0022021 A1 Jan. 16, 2025

Related U.S. Application Data

(63) Continuation of application No. 17/718,593, filed on Apr. 12, 2022, now Pat. No. 12,136,113.

(51) Int. Cl.
*G06Q 30/0282* (2023.01)
*G06F 16/904* (2019.01)
*G06Q 10/0639* (2023.01)

(52) U.S. Cl.
CPC ....... *G06Q 30/0282* (2013.01); *G06F 16/904* (2019.01); *G06Q 10/06395* (2013.01)

(58) Field of Classification Search
None
See application file for complete search history.

(56) References Cited

U.S. PATENT DOCUMENTS 6,112,190 A 8/2000 Fletcher
6,314,404 B1 11/2001 Good
(Continued)

FOREIGN PATENT DOCUMENTS

CA 2938530 A1 2/2017
CA 3061594 A1 * 5/2020 ............ G06Q 20/10
(Continued)

OTHER PUBLICATIONS

Nnamocha, Obiageli A., and Tutah T. Chukundah. “Celebrity Endorsements and Customer Patronage.” Journal of Economics and Management Sciences (2018): p. 45-p. 45. (Year: 2018).*
(Continued)

*Primary Examiner* — Thomas L Mansfield
(74) *Attorney, Agent, or Firm* — Michael A. Springs, Esq.; Shumaker, Loop & Kendrick, LLP; Patrick B. Horne

(57) ABSTRACT

A computing system may include a network connecting ally computers, a server, and an enterprise computer. The ally computers may be configured to send and to receive a patron endorsement from one line to another line. The server may be configured to index the patron endorsement into an endorsement data set by a unique patron number associated with a patron name, a sending line, a receiving line, and a patron needs met indication. The server may transform transform an enterprise patron needs met indication based on both sending line and receiving line as indexed in the first endorsement data set. The graphical user interface may depict first and second graphical user interfaces containing data fields populatable with the sending/receiving line and a number of endorsements, the patron needs met indication, and a conversion rate. A third graphical user interface may include data fields populatable with the enterprise patrons needs met.

19 Claims, 12 Drawing Sheets

(56) References Cited

U.S. PATENT DOCUMENTS

| | | | | |
|---|---|---|---|---|
| 7,020,621 | B1 | 3/2006 | Feria | |
| 7,472,110 | B2 | 12/2008 | Achlioptas | |
| 8,244,593 | B2 | 8/2012 | Klinger | |
| 8,527,402 | B2 | 9/2013 | McDonald | |
| 8,725,630 | B1 | 5/2014 | Delinsky | |
| 9,811,863 | B1 | 11/2017 | Marinescu | |
| 11,144,861 | B1 | 10/2021 | McGregor | |
| 11,861,295 | B2 | 1/2024 | Li | |
| 2005/0004885 | A1 | 1/2005 | Pandian | |
| 2008/0103841 | A1 | 5/2008 | Lewis | |
| 2009/0265257 | A1 | 10/2009 | Kilinger | |
| 2010/0114759 | A1 | 5/2010 | Fuentes-Torres | |
| 2010/0332290 | A1 | 12/2010 | Narvaez | |
| 2010/0332312 | A1* | 12/2010 | Klinger | G06Q 30/02 707/812 |
| 2013/0226674 | A1 | 8/2013 | Field | |
| 2014/0351128 | A1 | 11/2014 | Chou | |
| 2015/0161541 | A1 | 6/2015 | Brennan | |
| 2017/0046651 | A1 | 2/2017 | Lin | |
| 2017/0235848 | A1 | 8/2017 | Van Dusen | |
| 2018/0322597 | A1 | 11/2018 | Sher | |
| 2020/0004973 | A1 | 1/2020 | Li | |
| 2020/0151686 | A1* | 5/2020 | Komandur | G06F 16/2315 |
| 2022/0230122 | A1 | 7/2022 | Mimassi | |
| 2023/0379699 | A1 | 11/2023 | Oerton | |

FOREIGN PATENT DOCUMENTS

| | | | | |
|---|---|---|---|---|
| CN | 110661610 | B * | 11/2020 | H04L 9/50 |
| WO | 2015136555 | A2 | 9/2015 | |

OTHER PUBLICATIONS

Tan, Justin, Jun Yang, and Rajaram Veliyath. "Particularistic and system trust among small and medium enterprises: A comparative study in China's transition economy." Journal of Business Venturing 24.6 (2009): 544-557. (Year: 2009).*

Merriam-Webster dictionary define the word "line" retrieved from https://www.merriam-webster.com/dictionary/line (Year: 2024).

Wu, Katrina. "YouTube marketing: Legality of sponsorship and endorsements in advertising." JL Bus. & Ethics 22 (2016): 59. (Year: 2016).

Pearson, Stewart. Building brands directly; creating business value from customer relationships. Springer, 2016. (Year: 2016).

Noone, Breffni M., Sheryl E. Kimes, and Leo M. Renaghan. "Integrating customer relationship management and revenue management: A hotel perspective." Journal of Revenue and Pricing Management 2 (2003): 7-21. (Year: 2003).

* cited by examiner 100
110
106
258
200
212
210
254
252
206
206
i/O 236
COMM 250
MEM 222
PROCESSOR 220
238
STORAGE 224
INSTRUCTIONS 226
APPLICATION 232
230
DATA 234
154
152
106
COMM 150
i/O 136
PWR 128
GPS 108
138
MEM 122
PROCESSOR 120
STORAGE 124
INSTRUCTIONS 126
APPLICATION 132
130
DATA 134
702
706
COMM 750
i/O 736
PWR 728
GPS 708
MEM 722
PROCESSOR 720
STORAGE 724
INSTRUCTIONS 726
APPLICATION 732
DATA 734

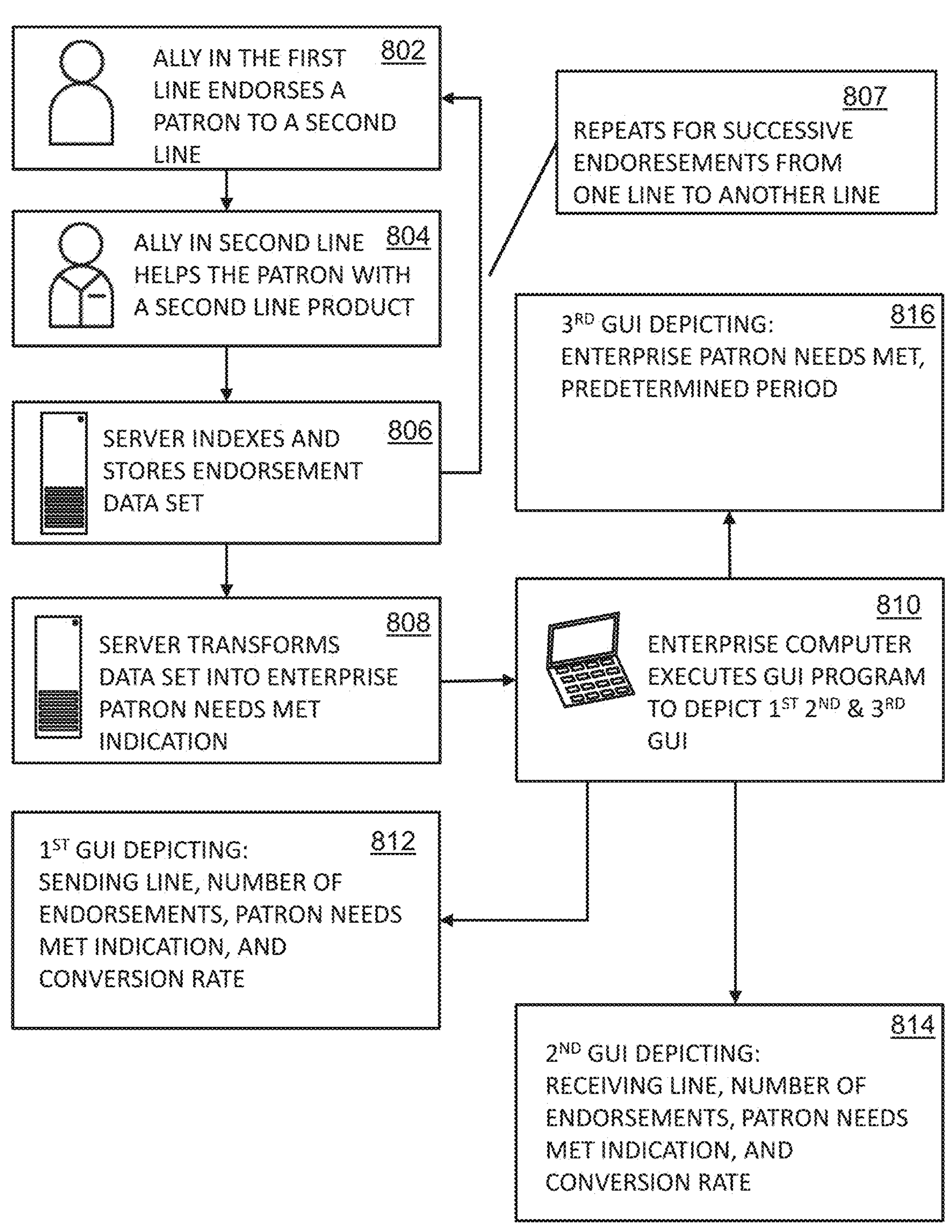
FIG. 2
ALLY IN THE FIRST LINE ENDORSES A PATRON TO A SECOND LINE
802
ALLY IN SECOND LINE HELPS THE PATRON WITH A SECOND LINE PRODUCT
804
SERVER INDEXES AND STORES ENDORSEMENT DATA SET
806
807
REPEATS FOR SUCCESSIVE ENDORESEMENTS FROM ONE LINE TO ANOTHER LINE
SERVER TRANSFORMS DATA SET INTO ENTERPRISE PATRON NEEDS MET INDICATION
808
3RD GUI DEPICTING: ENTERPRISE PATRON NEEDS MET, PREDETERMINED PERIOD
816
810
ENTERPRISE COMPUTER EXECUTES GUI PROGRAM TO DEPICT 1ST 2ND & 3RD GUI
1ST GUI DEPICTING: SENDING LINE, NUMBER OF ENDORSEMENTS, PATRON NEEDS MET INDICATION, AND CONVERSION RATE
812
814
2ND GUI DEPICTING: RECEIVING LINE, NUMBER OF ENDORSEMENTS, PATRON NEEDS MET INDICATION, AND CONVERSION RATE

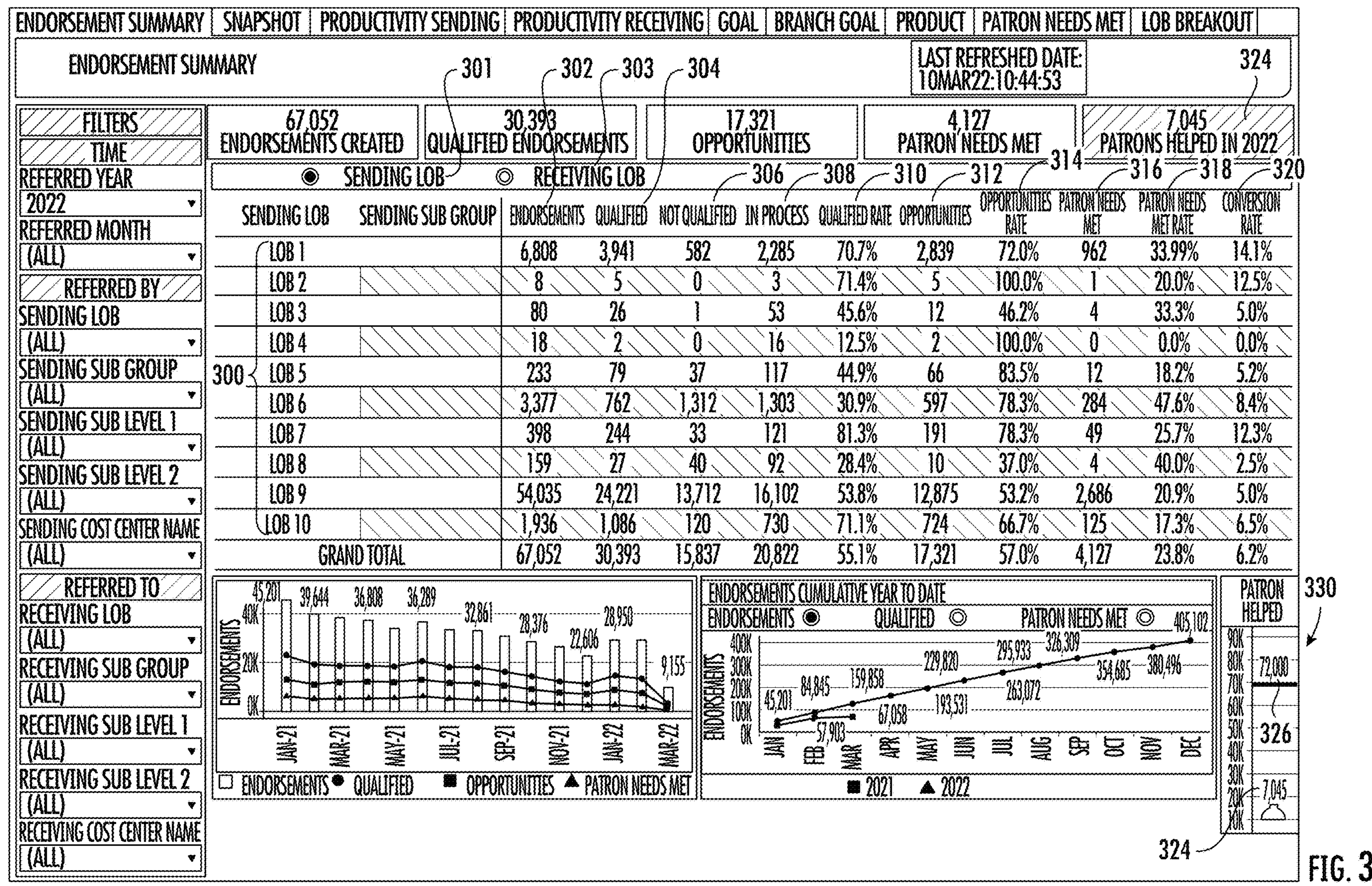
| SENDING LOB | SENDING SUB GROUP | ENDORSEMENTS | QUALIFIED | NOT QUALIFIED | IN PROCESS | QUALIFIED RATE | OPPORTUNITIES | OPPORTUNITIES RATE | PATRON NEEDS MET | PATRON NEEDS MET RATE | CONVERSION RATE |
|---|---|---|---|---|---|---|---|---|---|---|---|
| LOB 1 | | 6,808 | 3,941 | 582 | 2,285 | 70.7% | 2,839 | 72.0% | 962 | 33.99% | 14.1% |
| LOB 2 | | 8 | 5 | 0 | 3 | 71.4% | 5 | 100.0% | 1 | 20.0% | 12.5% |
| LOB 3 | | 80 | 26 | 1 | 53 | 45.6% | 12 | 46.2% | 4 | 33.3% | 5.0% |
| LOB 4 | | 18 | 2 | 0 | 16 | 12.5% | 2 | 100.0% | 0 | 0.0% | 0.0% |
| LOB 5 | | 233 | 79 | 37 | 117 | 44.9% | 66 | 83.5% | 12 | 18.2% | 5.2% |
| LOB 6 | | 3,377 | 762 | 1,312 | 1,303 | 30.9% | 597 | 78.3% | 284 | 47.6% | 8.4% |
| LOB 7 | | 398 | 244 | 33 | 121 | 81.3% | 191 | 78.3% | 49 | 25.7% | 12.3% |
| LOB 8 | | 159 | 27 | 40 | 92 | 28.4% | 10 | 37.0% | 4 | 40.0% | 2.5% |
| LOB 9 | | 54,035 | 24,221 | 13,712 | 16,102 | 53.8% | 12,875 | 53.2% | 2,686 | 20.9% | 5.0% |
| LOB 10 | | 1,936 | 1,086 | 120 | 730 | 71.1% | 724 | 66.7% | 125 | 17.3% | 6.5% |
| GRAND TOTAL | | 67,052 | 30,393 | 15,837 | 20,822 | 55.1% | 17,321 | 57.0% | 4,127 | 23.8% | 6.2% |

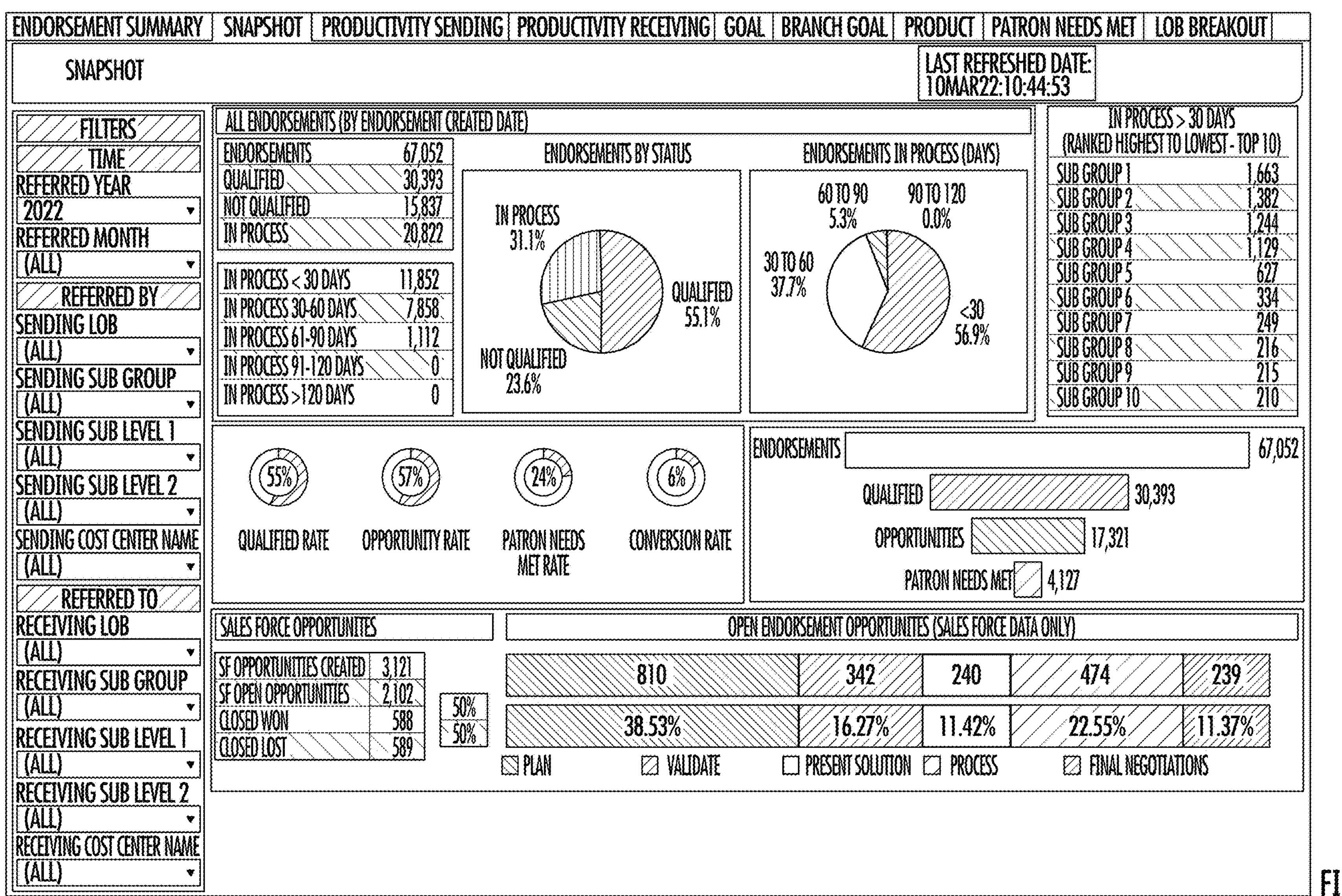
ENDORSEMENT SUMMARY
SNAPSHOT
PRODUCTIVITY SENDING
PRODUCTIVITY RECEIVING
GOAL
BRANCH GOAL
PRODUCT
PATRON NEEDS MET
LOB BREAKOUT
SNAPSHOT
LAST REFRESHED DATE:
10MAR22:10:44:53
FILTERS
TIME
REFERRED YEAR
2022
REFERRED MONTH
(ALL)
REFERRED BY
SENDING LOB
(ALL)
SENDING SUB GROUP
(ALL)
SENDING SUB LEVEL 1
(ALL)
SENDING SUB LEVEL 2
(ALL)
SENDING COST CENTER NAME
(ALL)
REFERRED TO
RECEIVING LOB
(ALL)
RECEIVING SUB GROUP
(ALL)
RECEIVING SUB LEVEL 1
(ALL)
RECEIVING SUB LEVEL 2
(ALL)
RECEIVING COST CENTER NAME
(ALL)
ALL ENDORSEMENTS (BY ENDORSEMENT CREATED DATE)
ENDORSEMENTS 67,052
QUALIFIED 30,393
NOT QUALIFIED 15,837
IN PROCESS 20,822
IN PROCESS < 30 DAYS 11,852
IN PROCESS 30-60 DAYS 7,858
IN PROCESS 61-90 DAYS 1,112
IN PROCESS 91-120 DAYS 0
IN PROCESS >120 DAYS 0
ENDORSEMENTS BY STATUS
IN PROCESS 31.1%
QUALIFIED 55.1%
NOT QUALIFIED 23.6%
ENDORSEMENTS IN PROCESS (DAYS)
60 TO 90 5.3%
90 TO 120 0.0%
30 TO 60 37.7%
<30 56.9%
IN PROCESS > 30 DAYS
(RANKED HIGHEST TO LOWEST - TOP 10)
SUB GROUP 1 1,663
SUB GROUP 2 1,382
SUB GROUP 3 1,244
SUB GROUP 4 1,129
SUB GROUP 5 627
SUB GROUP 6 334
SUB GROUP 7 249
SUB GROUP 8 216
SUB GROUP 9 215
SUB GROUP 10 210
55%
QUALIFIED RATE
57%
OPPORTUNITY RATE
24%
PATRON NEEDS MET RATE
6%
CONVERSION RATE
ENDORSEMENTS 67,052
QUALIFIED 30,393
OPPORTUNITIES 17,321
PATRON NEEDS MET 4,127
SALES FORCE OPPORTUNITIES
SF OPPORTUNITIES (CREATED) 3,121
SF OPEN OPPORTUNITIES 2,102
CLOSED WON 588
CLOSED LOST 589
50%
50%
OPEN ENDORSEMENT OPPORTUNITIES (SALES FORCE DATA ONLY)
810
342
240
474
239
38.53%
16.27%
11.42%
22.55%
11.37%
PLAN
VALIDATE
PRESENT SOLUTION
PROCESS
FINAL NEGOTIATIONS
FIG. 5

ENDORSEMENT SUMMARY | SNAPSHOT | PRODUCTIVITY SENDING | PRODUCTIVITY RECEIVING | GOAL | BRANCH GOAL | PRODUCT | PATRON NEEDS MET | LOB BREAKOUT

ALLY PRODUCTIVITY - SENDING

LAST REFRESHED DATE: 10MAR22:10:44:53

FILTERS
TIME
REFERRED YEAR
2022
REFERRED MONTH
(ALL)
REFERRED BY
SENDING LOB
(ALL)
SENDING SUB GROUP
(ALL)
SENDING SUB LEVEL 1
(ALL)
SENDING SUB LEVEL 2
(ALL)
SENDING COST CENTER NAME
(ALL)
REFERRED TO
RECEIVING LOB
(ALL)
RECEIVING SUB GROUP
(ALL)
RECEIVING SUB LEVEL 1
(ALL)
RECEIVING SUB LEVEL 2
(ALL)
RECEIVING COST CENTER NAME
(ALL)

67,052 ENDORSEMENTS CREATED
30,393 QUALIFIED ENDORSEMENTS
17,321 OPPORTUNITIES
4,127 PATRON NEEDS MET
7,045 PATRONS HELPED IN 2021

| SENDING ALLY | ENDORSEMENTS | QUALIFIED | NOT QUALIFIED | IN PROCESS | QUALIFIED RATE | OPPORTUNITIES | OPPORTUNITIES RATE | PATRON NEEDS MET | PATRON NEEDS MET RATE | CONVERSION RATE |
|---|---|---|---|---|---|---|---|---|---|---|
| ALLY 1 | 109 | 29 | 58 | 22 | 32.2% | 24 | 82.8% | 1 | 4.2% | 0.9% |
| ALLY 2 | 94 | 18 | 34 | 42 | 25.0% | 10 | 55.6% | 1 | 10.0% | 1.1% |
| ALLY 3 | 82 | 19 | 52 | 11 | 26.8% | 14 | 73.7% | 3 | 21.4% | 3.7% |
| ALLY 4 | 77 | 31 | 21 | 25 | 50.8% | 21 | 67.7% | 3 | 14.3% | 3.9% |
| ALLY 5 | 72 | 45 | 13 | 14 | 71.4% | 39 | 86.7% | 6 | 15.4% | 8.3% |
| ALLY 6 | 69 | 10 | 52 | 7 | 14.5% | 7 | 70.0% | 1 | 14.3% | 1.4% |
| ALLY 7 | 66 | 12 | 35 | 19 | 23.5% | 9 | 75.0% | 1 | 11.1% | 1.5% |
| ALLY 8 | 63 | 46 | 3 | 14 | 78.0% | 40 | 87.0% | 4 | 10.0% | 6.3% |
| ALLY 9 | 60 | 14 | 27 | 19 | 26.9% | 6 | 42.9% | 0 | 0.0% | 0.0% |
| ALLY 10 | 60 | 23 | 2 | 35 | 52.3% | 11 | 47.8% | 3 | 27.3% | 5.0% |
| ALLY 11 | 60 | 13 | 37 | 10 | 24.5% | 9 | 69.2% | 1 | 11.1% | 1.7% |
| ALLY 12 | 57 | 18 | 18 | 21 | 46.2% | 8 | 44.4% | 2 | 25.0% | 3.5% |
| ALLY 13 | 54 | 11 | 37 | 6 | 21.6% | 3 | 27.3% | 0 | 0.0% | 0.0% |
| ALLY 14 | 54 | 17 | 27 | 10 | 34.7% | 10 | 58.8% | 1 | 10.0% | 1.9% |

ACTIVE PRODUCERS
JAN FEB MAR
7,371
5,766
7,449
5,618
4,450
2,080
PRODUCERS WITH A ENDORSEMENT
PRODUCERS WITH A QUALIFIED ENDORSEMENT

AVERAGE ENDORSEMENTS PER ACTIVE PRODUCER
JAN FEB MAR
3.93
1.95
3.89
1.77
2.06
0.63
ENDORSEMENT
QUALIFIED ENDORSEMENT

FIG. 6

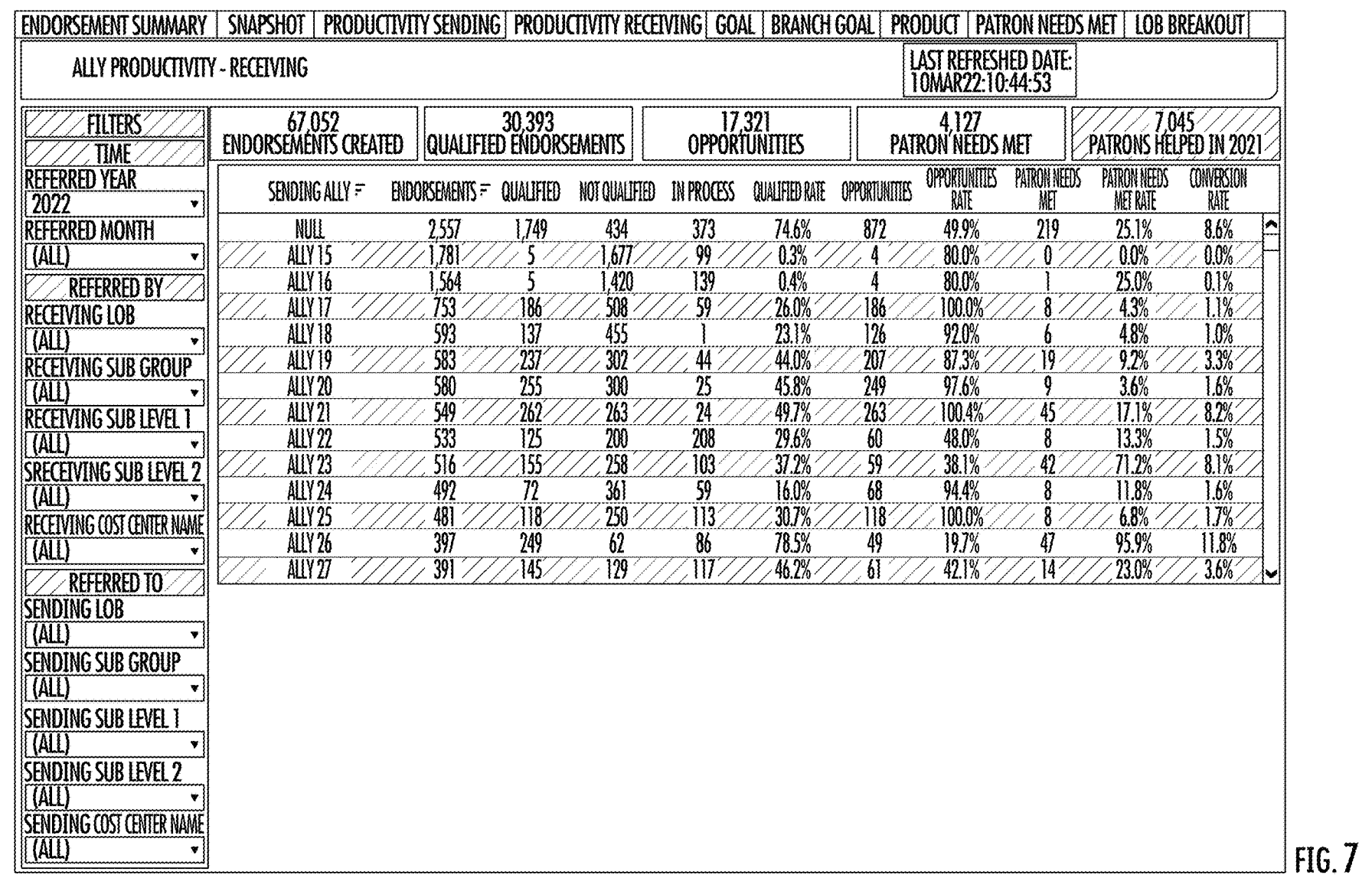

ENDORSEMENT SUMMARY | SNAPSHOT | PRODUCTIVITY SENDING | PRODUCTIVITY RECEIVING | GOAL | BRANCH GOAL | PRODUCT | PATRON NEEDS MET | LOB BREAKOUT

ALLY PRODUCTIVITY - RECEIVING

LAST REFRESHED DATE: 10MAR22:10:44:53

FILTERS
TIME
REFERRED YEAR
2022
REFERRED MONTH
(ALL)
REFERRED BY
RECEIVING LOB
(ALL)
RECEIVING SUB GROUP
(ALL)
RECEIVING SUB LEVEL 1
(ALL)
SRECEIVING SUB LEVEL 2
(ALL)
RECEIVING COST CENTER NAME
(ALL)
REFERRED TO
SENDING LOB
(ALL)
SENDING SUB GROUP
(ALL)
SENDING SUB LEVEL 1
(ALL)
SENDING SUB LEVEL 2
(ALL)
SENDING COST CENTER NAME
(ALL)

67,052 ENDORSEMENTS CREATED | 30,393 QUALIFIED ENDORSEMENTS | 17,321 OPPORTUNITIES | 4,127 PATRON NEEDS MET | 7,045 PATRONS HELPED IN 2021

| SENDING ALLY | ENDORSEMENTS | QUALIFIED | NOT QUALIFIED | IN PROCESS | QUALIFIED RATE | OPPORTUNITIES | OPPORTUNITIES RATE | PATRON NEEDS MET | PATRON NEEDS MET RATE | CONVERSION RATE |
|---|---|---|---|---|---|---|---|---|---|---|
| NULL | 2,557 | 1,749 | 434 | 373 | 74.6% | 872 | 49.9% | 219 | 25.1% | 8.6% |
| ALLY 15 | 1,781 | 5 | 1,677 | 99 | 0.3% | 4 | 80.0% | 0 | 0.0% | 0.0% |
| ALLY 16 | 1,564 | 5 | 1,420 | 139 | 0.4% | 4 | 80.0% | 1 | 25.0% | 0.1% |
| ALLY 17 | 753 | 186 | 508 | 59 | 26.0% | 186 | 100.0% | 8 | 4.3% | 1.1% |
| ALLY 18 | 593 | 137 | 455 | 1 | 23.1% | 126 | 92.0% | 6 | 4.8% | 1.0% |
| ALLY 19 | 583 | 237 | 302 | 44 | 44.0% | 207 | 87.3% | 19 | 9.2% | 3.3% |
| ALLY 20 | 580 | 255 | 300 | 25 | 45.8% | 249 | 97.6% | 9 | 3.6% | 1.6% |
| ALLY 21 | 549 | 262 | 263 | 24 | 49.7% | 263 | 100.4% | 45 | 17.1% | 8.2% |
| ALLY 22 | 533 | 125 | 200 | 208 | 29.6% | 60 | 48.0% | 8 | 13.3% | 1.5% |
| ALLY 23 | 516 | 155 | 258 | 103 | 37.2% | 59 | 38.1% | 42 | 71.2% | 8.1% |
| ALLY 24 | 492 | 72 | 361 | 59 | 16.0% | 68 | 94.4% | 8 | 11.8% | 1.6% |
| ALLY 25 | 481 | 118 | 250 | 113 | 30.7% | 118 | 100.0% | 8 | 6.8% | 1.7% |
| ALLY 26 | 397 | 249 | 62 | 86 | 78.5% | 49 | 19.7% | 47 | 95.9% | 11.8% |
| ALLY 27 | 391 | 145 | 129 | 117 | 46.2% | 61 | 42.1% | 14 | 23.0% | 3.6% |

FIG. 7

ENDORSEMENT SUMMARY | SNAPSHOT | PRODUCTIVITY SENDING | PRODUCTIVITY RECEIVING | GOAL | BRANCH GOAL | PRODUCT | PATRON NEEDS MET | LOB BREAKOUT

PERFORMANCE TO GOAL

LAST REFRESHED DATE: 10MAR22:10:44:53

FILTERS

TIME
REPORTING MONTH
(ALL)

REFERRED BY
SENDING LOB
(ALL)
SENDING SUB GROUP
(ALL)
SENDING SUB LEVEL 1
(ALL)
SENDING SUB LEVEL 2
(ALL)
SENDING COST CENTER NAME
(ALL)

BY HIERARCHY LEVELS | BY ALLY

| REF BY LOB | TYPE | PREFORMANCE | GOAL | PREFORMANCE TO GOAL |
|---|---|---|---|---|
| LOB 6 | GROSS | 3,214 | 2,906 | 110.6% |
| LOB 7 | GROSS | 381 | 484 | 78.7% |
| LOB 9 | QUALIFIED | 1,889 | 2,818 | 67.0% |
| LOB 1 | QUALIFIED | 3,840 | 15,394 | 24.9% |
| LOB 8 | GROSS | 147 | 688 | 21.4% |
| LOB 10 | QUALIFIED | 1,029 | 4,923 | 20.9% |
| LOB 5 | QUALIFIED | 48 | 803 | 6.0% |

FIG. 8

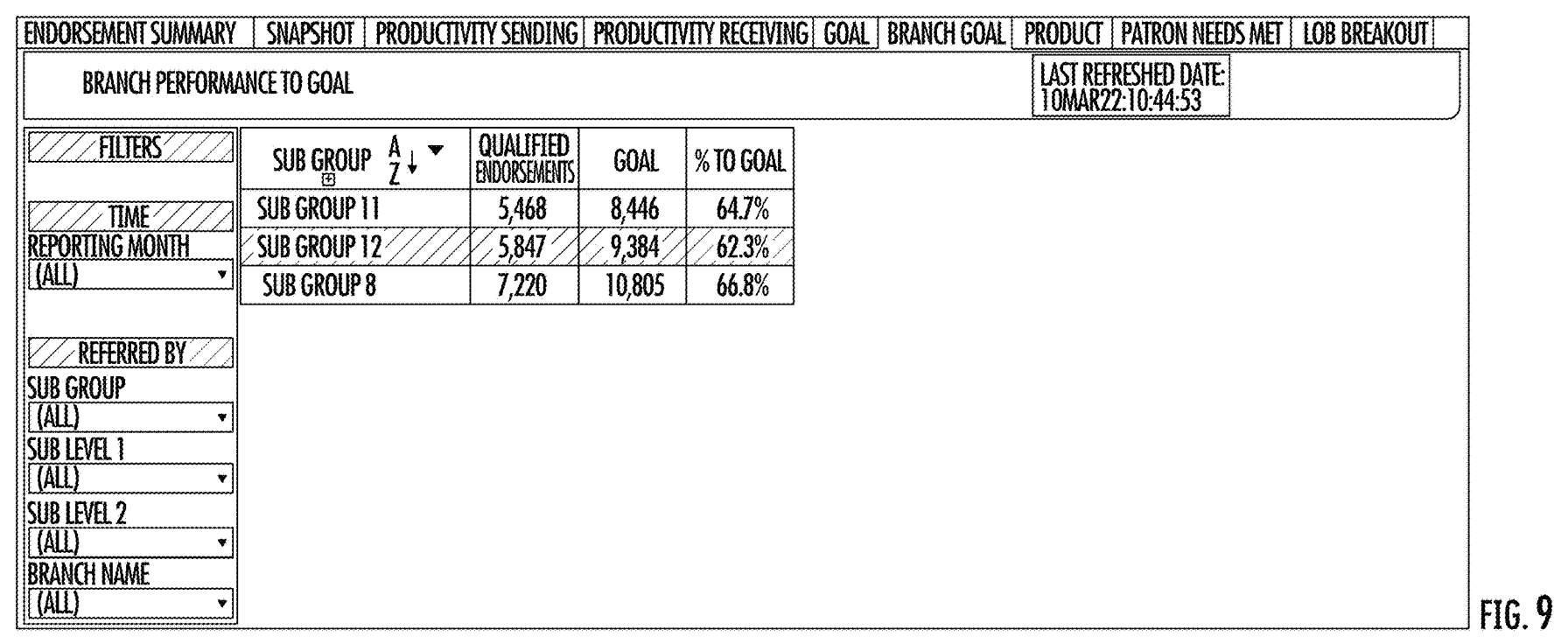

ENDORSEMENT SUMMARY | SNAPSHOT | PRODUCTIVITY SENDING | PRODUCTIVITY RECEIVING | GOAL | BRANCH GOAL | PRODUCT | PATRON NEEDS MET | LOB BREAKOUT

BRANCH PERFORMANCE TO GOAL

LAST REFRESHED DATE:
10MAR22:10:44:53

FILTERS

TIME
REPORTING MONTH
(ALL)

REFERRED BY
SUB GROUP
(ALL)
SUB LEVEL 1
(ALL)
SUB LEVEL 2
(ALL)
BRANCH NAME
(ALL)

| SUB GROUP A Z ↓ | QUALIFIED ENDORSEMENTS | GOAL | % TO GOAL |
|---|---|---|---|
| SUB GROUP 11 | 5,468 | 8,446 | 64.7% |
| SUB GROUP 12 | 5,847 | 9,384 | 62.3% |
| SUB GROUP 8 | 7,220 | 10,805 | 66.8% |

FIG. 9

ENDORSEMENT SUMMARY | SNAPSHOT | PRODUCTIVITY SENDING | PRODUCTIVITY RECEIVING | GOAL | BRANCH GOAL | PRODUCT | PATRON NEEDS MET | LOB BREAKOUT

PRODUCT

LAST REFRESHED DATE:
10MAR22:10:44:53

FILTERS
TIME
REFERRED YEAR
2022
REFERRED MONTH
(ALL)
REFERRED BY
SENDING LOB
(ALL)
SENDING SUB GROUP
(ALL)
SENDING SUB LEVEL 1
(ALL)
SENDING SUB LEVEL 2
(ALL)
SENDING COST CENTER NAME
(ALL)
REFERRED TO
RECEIVING LOB
(ALL)
RECEIVING SUB GROUP
(ALL)
RECEIVING SUB LEVEL 1
(ALL)
RECEIVING SUB LEVEL 2
(ALL)
RECEIVING COST CENTER NAME
(ALL)

67,052 ENDORSEMENTS CREATED 30,393 QUALIFIED ENDORSEMENTS 17,321 OPPORTUNITIES 4,127 PATRON NEEDS MET

| PRODUCT | ENDORSEMENTS | QUALIFIED | OPPORTUNITIES | PATRON NEEDS MET |
|---|---|---|---|---|
| PRODUCT 1 | 6,136 | 2,817 | 1,753 | 499 |
| PRODUCT 2 | 3,578 | 1,828 | 937 | 478 |
| PRODUCT 3 | 4,653 | 1,921 | 762 | 421 |
| PRODUCT 4 | 4,036 | 1,845 | 1,042 | 306 |
| PRODUCT 5 | 453 | 261 | 261 | 193 |
| PRODUCT 6 | 4,261 | 1,534 | 1,234 | 177 |
| PRODUCT 7 | 218 | 162 | 160 | 160 |
| PRODUCT 8 | 712 | 395 | 395 | 147 |
| PRODUCT 9 | 10,572 | 7,951 | 2,860 | 117 |
| PRODUCT 10 | 3,762 | 916 | 858 | 114 |
| PRODUCT 11 | 1,293 | 512 | 320 | 93 |
| PRODUCT 12 | 608 | 81 | 81 | 81 |
| PRODUCT 13 | 772 | 239 | 192 | 78 |
| PRODUCT 14 | 2,305 | 777 | 704 | 67 |
| PRODUCT 15 | 497 | 188 | 66 | 65 |
| PRODUCT 16 | 282 | 282 | 282 | 56 |
| PRODUCT 17 | 216 | 54 | 54 | 54 |
| PRODUCT 18 | 405 | 287 | 233 | 52 |
| PRODUCT 19 | 210 | 194 | 120 | 48 |
| PRODUCT 20 | 3,164 | 2,472 | 902 | 48 |
| PRODUCT 21 | 177 | 121 | 96 | 48 |
| PRODUCT 22 | 177 | 116 | 95 | 46 |
| PRODUCT 23 | 117 | 48 | 48 | 46 |
| PRODUCT 24 | 199 | 130 | 103 | 43 |
| PRODUCT 25 | 5,052 | 862 | 833 | 42 |
| PRODUCT 26 | 123 | 84 | 67 | 37 |
| PRODUCT 27 | 138 | 138 | 138 | 35 |

WINS BY PRODUCT
PRODUCT 5
PRODUCT 4
PRODUCT 3
PRODUCT 2
PRODUCT 1
OTHER
193
306
421
478
499
2,230

FIG. 10

GRAPHICAL USER INTERFACE GENERATION SYSTEMS

CROSS-REFERENCE TO RELATED APPLICATIONS

This is a continuation application tracing priority to co-pending U.S. patent application Ser. No. 17/718,593 filed Apr. 12, 2022, entitled GRAPHICAL USER INTERFACE PROGRAM EXECUTABLE TO TRANSFORM ENTERPRISE PATRON NEEDS MET DATA, the entire contents of which are hereby expressly incorporated herein by reference.

TECHNICAL FIELD AND BACKGROUND OF INVENTION

This invention relates generally to the field graphical user interfaces, and more particularly, embodiments of the invention relate to the field of enterprise level graphical user interfaces for visualizing complex data transformed from underlying endorsement data sets.

Endorsements may be made from one line to another. There may be situations where individual lines, branches, or even enterprises individually and internally track endorsements at some rudimentary level. However, such tracking is not useful for enterprise level analysis as it can skew the data away from important patron specific data. Accordingly, there is a need in the art for a system and interface that transforms endorsement data in a way that does not skew or diminish patron specific data. There is also a need in the art for a system that graphically depicts the patron specific data between lines at an enterprise level in a way that fosters achieving and surpassing enterprise level goals.

BRIEF SUMMARY

It is therefore an object of the present invention to provide a system and graphical user interface for transforming endorsement data in a way that does not skew or diminish patron specific data.

It is a further object of the present invention to provide a system and graphical user interface for graphically depicting patron specific data at an enterprise level in a way that fosters achieving and surpassing enterprise level goals.

These and other objects and advantages of the invention are achieved by providing a computer system having a plurality of ally computers. Each ally computer of the plurality of ally computers may be associated with a first line selected from a plurality of lines. Each ally computer may have a memory device with computer-readable program code, a communication device, and a processing device operatively coupled to the memory device and to the communication device. The processing device may be configured to execute the computer-readable code to receive a first endorsement input from a human ally. The first endorsement input may include a first patron endorsement from the first line to a second line such that each of the first line and the second line selected from the plurality of lines. The processing device may be configured to also transmit via the communication device in communication with a network the first endorsement input to the second line. The processing device may be configured to receive a second patron endorsement from a line that is distinct from the first line.

The system may also include a server computer having a memory device with computer-readable program code. The server computer may have a communication device in communication with the network and a processing device operatively coupled to the memory device and to the communication device. The processing device may be configured to execute the computer-readable code to index the first endorsement input into a first endorsement data set by: (i) a unique patron number associated with a patron name associated with the first patron endorsement, (ii) a sending line associated with the first line, (iii) a receiving line associated with second line; and (iv) a patron needs met indication associated with the unique patron number. The processing device may be configured to store in the memory device of the server computer the first endorsement data set. The processing device may be configured to transform and determine: (i) an enterprise patron needs met indication based on both sending line and receiving line as indexed in the first endorsement data set; and (ii) a conversion rate for each receiving line and each sending line based on the patron needs met indication and based on a number of endorsements for each receiving line and each sending line over a predetermined period.

In particular, the enterprise patron needs met indication is an indication of total the total times patrons needs were met across the enterprise, during the predetermine time period, regardless of the total number of patrons. For instance, on patron may have been helped a single time, or numerous times by multiple receiving lines across the entire enterprise. This unique number is based at least on a total number of enterprise wide endorsements which is calculated based on indexed patron specific data, where the endorsement was then qualified based on particularized patron data applicable to a specific receiving line. The qualified endorsement must then be successful such that the patron has acquired or acceded to the product/service offered by the receiving line to which the patron was endorsed by the sending line.

The system may also include an enterprise computer having a memory device having computer-readable program code, a communication device in communication with the network, a processing device operatively coupled to the memory device and to the communication device, a display.

The system may also include a graphical user interface program when executed by the enterprise computer functions to depict a first graphical user interface on the display of the enterprise computer. The first graphical user interface may include a plurality of first graphical user interface images containing a plurality of data fields populatable with the sending line, the number of endorsements for the sending line, a qualified rate for the sending line, the patron needs met indication for the sending line, and the conversion rate for the sending line.

The graphical user interface program may also depict a second graphical user interface on the display of the enterprise computer. The second graphical user interface may include a plurality of second graphical user interface images containing a plurality of data fields populatable with the receiving line, the number of endorsements for the receiving line, a qualified rate for the receiving line, the patron needs met indication for the receiving line, and the conversion rate for the receiving line.

The graphical user interface program may further depict a third graphical user interface on the display of the enterprise computer, the third graphical user interface may include a plurality of third graphical user interface images containing a plurality of data fields populatable with the enterprise patrons needs met indication and the predetermined time period.

According to another embodiment of the invention, the plurality of data fields populatable in the first graphical user interface further may include a number of qualified endorsements.

According to another embodiment of the invention, the plurality of data fields populatable in the first graphical user interface further may include a number of non-qualified endorsements.

According to another embodiment of the invention, the respective first and second graphical user interfaces each includes a pair of radio buttons, labeled sending line and receiving line, and wherein either radio button is selectable to toggle between respective first and second graphical user interfaces.

According to another embodiment of the invention, the conversion rate may be the patron needs met indication divided by the total number of endorsements.

According to another embodiment of the invention, the predetermined period is one year.

According to another embodiment of the invention, the predetermined period may be one month.

According to another embodiment of the invention, a computer system may include a plurality of ally computers. Each ally computer of the plurality of ally computers may be associated with a first line selected from a plurality of lines and having a processor configured to receive an endorsement input from the first line and to transmit via a network the endorsement input to a second line. The system may include a server computer operably connected to the plurality of ally computers via network and having a memory device and a processing device. The processing device may be configured to execute the computer-readable code to: index the endorsement input into a first endorsement data set by: (i) a unique patron number associated with a patron name, (ii) a sending line associated with the first line, (iii) a receiving line associated with second line; and (iv) a patron needs met indication. The processing device may be configured to store in the memory device of the server computer the first endorsement data set. The processing device may be configured to transform and determine: (i) an enterprise patron needs met indication based on both sending line and receiving line as indexed in the first endorsement data set; and (ii) a conversion rate for each receiving line and each sending line based on the patron needs met indication and based on a number of endorsements for each receiving line and each sending line over a predetermined period.

The system may further include an enterprise computer operably connected to the server computer and having a processing device and a display.

The system may further include a graphical user interface program when executed by the enterprise computer functions to depict a first graphical user interface on the display of the enterprise computer. The first graphical user interface may include a plurality of first graphical user interface images containing a plurality of data fields populatable with the sending line, the number of endorsements for the sending line, a qualified rate for the sending line, the patron needs met indication for the sending line, and the conversion rate for the sending line.

The graphical user interface program may further depict a second graphical user interface on the display of the enterprise computer. The second graphical user interface may include a plurality of second graphical user interface images containing a plurality of data fields populatable with the receiving line, the number of endorsements for the receiving line, a qualified rate for the receiving line, the patron needs met indication for the receiving line, and the conversion rate for the receiving line.

The graphical user interface program may further depict a third graphical user interface on the display of the enterprise computer, the third graphical user interface including a plurality of third graphical user interface images containing a plurality of data fields populatable with the enterprise patrons needs met indication and the predetermined time period.

According to another embodiment of the present invention, the plurality of data fields populatable in the first graphical user interface may include a number of qualified endorsements.

According to another embodiment of the present invention, the plurality of data fields populatable in the first graphical user interface further ma include a number of non-qualified endorsements.

According to another embodiment of the invention, the respective first and second graphical user interfaces each may include a pair of radio buttons, labeled sending line and receiving line, and wherein either radio button is selectable to toggle between respective first and second graphical user interfaces.

According to another embodiment of the invention, the conversion rate may be the patron needs met indication divided by the total number of endorsements.

According to another embodiment of the invention, the predetermined period may be one year.

According to another embodiment of the invention, the predetermined period may be one month.

According to another embodiment of the invention, a computing system may include a plurality of ally computers, a server computer, and an enterprise computer each in communication with one another via a network. According to such an embodiment, each one of the ally computers may be configured to receive a patron endorsement from one line to another line. The server computer may be configured to: index the patron endorsement into a first endorsement data set by: (i) a unique patron number associated with a patron name, (ii) a sending line, (iii) a receiving line; and (iv) a patron needs met indication. The server computer may be configured to transform and determine: (i) an enterprise patron needs met indication based on both sending line and receiving line as indexed in the first endorsement data set; and (ii) a conversion rate for each receiving line and each sending line based on the patron needs met indication and based on a number of endorsements for each receiving line and each sending line over a predetermined period.

Further, the enterprise computer may include a graphical user interface program that, when executed by the enterprise computer, functions to depict a first graphical user interface on the display of the enterprise computer. The first graphical user interface may include a plurality of first graphical user interface images containing a plurality of data fields populatable with the sending line, the number of endorsements for the sending line, a qualified rate for the sending line, the patron needs met indication for the sending line, and the conversion rate for the sending line. The graphical user interface program may also depict a second graphical user interface on the display of the enterprise computer. The second graphical user interface may include a plurality of second graphical user interface images containing a plurality of data fields populatable with the receiving line, the number of endorsements for the receiving line, a qualified rate for the receiving line, the patron needs met indication for the receiving line, and the conversion rate for the receiving line. The graphical user interface program may also depict a third graphical user interface on the display of the enterprise computer. The third graphical user interface may include a plurality of third graphical user interface images containing a plurality of data fields populatable with the enterprise patrons needs met indication and the predetermined time period.

According to another embodiment of the invention, the receiving line may be one of the lines of the plurality of lines which receives the patron endorsement and wherein the sending line is one of the lines of the plurality of lines which sent the patron endorsement to the receiving line.

According to another embodiment of the invention, the plurality of data fields populatable in the first graphical user interface may further include a number of qualified endorsements.

According to another embodiment of the invention, the plurality of data fields populatable in the first graphical user interface may further include a number of non-qualified endorsements.

According to another embodiment of the invention, the respective first and second graphical user interfaces may each include a pair of radio buttons, labeled sending line and receiving line, and either radio button may be selectable to toggle between respective first and second graphical user interfaces.

According to another embodiment of the invention, the conversion rate may be the patron needs met indication divided by the total number of endorsements.

According to another embodiment of the invention, a computer system may have a plurality of ally computers where each ally computer of the plurality of ally computers may be associated with a first line selected from a plurality of lines, and each ally computer may have a memory device having computer-readable program code, a communication device, and a processing device operatively coupled to the memory device and to the communication device. The processing device may be configured to execute the computer-readable code to receive a first endorsement input from a human ally, the first endorsement input including a first patron endorsement from the first line to a second line, each of the first line and the second lines selected from the plurality of lines. The processing device may also be configured to transmit via the communication device in communication with a network the first endorsement input to the second line. The processing device may also be configured to receive a second patron endorsement from a line that is distinct from the first line.

The system may also include a server computer having a memory device having computer-readable program code, a communication device in communication with the network, and a processing device operatively coupled to the memory device and to the communication device. The processing device may be configured to execute the computer-readable code to index the first endorsement input into a first endorsement data set by a unique patron number associated with a patron name associated with the first patron endorsement, a sending line associated with the first line, a receiving line associated with second line, and a patron needs met indication. The processing device may also be configured to store in the memory device of the server computer the first endorsement data set. The processing device may also be configured to transform an enterprise patrons helped indication based on a total count of the patron needs met indication over a predetermined period.

The system may also include an enterprise computer having a memory device having computer-readable program code, a communication device in communication with the network, a processing device operatively coupled to the memory device and to the communication device, and a display.

The system may also include a graphical user interface program which, when executed by the enterprise computer, functions to depict a first graphical user interface on the display of the enterprise computer. The first graphical user interface may include a plurality of first graphical user interface images containing a plurality of data fields populatable with the sending line, the number of endorsements for the sending line, the patron needs met indication for the sending line, and a conversion rate for the sending line.

The graphical user interface program may also function to depict a second graphical user interface on the display of the enterprise computer, the second graphical user interface may include a plurality of second graphical user interface images containing a plurality of data fields populatable with the receiving line, the number of endorsements for the receiving line, the patron needs met indication for the receiving line, and a conversion rate for the receiving line.

The graphical user interface program may also function to depict a third graphical user interface on the display of the enterprise computer, the third graphical user interface may include a plurality of third graphical user interface images containing a plurality of data fields populatable with the enterprise patrons helped indication, the predetermined time period, and a predetermined threshold value of enterprise patrons helped indications.

According to another embodiment of the invention, the predetermined threshold value of enterprise patrons helped indications may be juxtaposed the enterprise patrons helped indication in the third graphical user interface.

According to another embodiment of the invention the third graphical user interface may further include a graphical linear scale depicting the predetermined threshold value of enterprise patrons helped indications and the enterprise patrons helped indication for gauging an enterprise progress towards the predetermined threshold value of enterprise patrons helped indications.

According to another embodiment of the invention, the respective first and second graphical user interfaces each may include a pair of radio buttons, labeled sending line and receiving line, and either radio button may be selectable to toggle between respective first and second graphical user interfaces.

According to another embodiment of the invention, the conversion rate may be the patron needs met indication divided by the total number of endorsements.

According to another embodiment of the invention, the predetermined period may be one year.

According to another embodiment of the invention, the predetermined period may be one month.

According to another embodiment of the invention, the computer system may include a plurality of ally computers. According to such an embodiment, each ally computer of the plurality of ally computers may be associated with a first line selected from a plurality of lines and having a processor configured to receive an endorsement input from the first line and to transmit via a network the endorsement input to a second line.

The computer system may also include a server computer operably connected to the plurality of ally computers via network and may have a memory device and a processing device. The processing device of the server computer may be configured to execute the computer-readable code to index the endorsement input into a first endorsement data set by a unique patron number associated with a patron name, a sending line associated with the first line, a receiving line associated with second line; and a patron needs met indication. The server computer may be further configured to execute computer-readable code to store in the memory device of the server computer the first endorsement data set. The server computer may be further configured to execute computer-readable code transform an enterprise patrons helped indication based on a total count of the patron needs met indication over a predetermined period.

The computer system may also include an enterprise computer operably connected to the server computer and having a processing device and a display.

The computer system may also include a graphical user interface program when executed by the enterprise computer functions to depict a first graphical user interface on the display of the enterprise computer. The first graphical user interface may include a plurality of first graphical user interface images containing a plurality of data fields populatable with the sending line, a number of endorsements for the sending line, the patron needs met indication for the sending line, and a conversion rate for the sending line.

The graphical user interface program when executed by the enterprise computer may function to depict a second graphical user interface on the display of the enterprise computer. The second graphical user interface may include a plurality of second graphical user interface images containing a plurality of data fields populatable with the receiving line, a number of endorsements for the receiving line, the patron needs met indication for the receiving line, and a conversion rate for the receiving line.

The graphical user interface program when executed by the enterprise computer may function to depict a third graphical user interface on the display of the enterprise computer, the third graphical user interface including a plurality of third graphical user interface images containing a plurality of data fields populatable with the enterprise patrons helped indication, the predetermined time period, and a predetermined threshold value of enterprise patrons helped indications.

According to another embodiment of the invention, the predetermined threshold value of enterprise patrons helped indications may be juxtaposed the enterprise patrons helped indication in the third graphical user interface.

According to another embodiment of the invention, the third graphical user interface further may include a graphical linear scale depicting the predetermined threshold value of enterprise patrons helped indications and the enterprise patrons helped indication for gauging an enterprise progress towards the predetermined threshold value of enterprise patrons helped indications.

According to another embodiment of the invention, the respective first and second graphical user interfaces each includes a pair of radio buttons, labeled sending line and receiving line, and either radio button may be selectable to toggle between respective first and second graphical user interfaces.

According to another embodiment of the invention, the conversion rate may be the patron needs met indication divided by the total number of endorsements.

According to another embodiment of the invention, the predetermined period may be one year.

According to another embodiment of the invention, the predetermined period may be one month.

According to another embodiment of the invention, a computing system may include a plurality of ally computers, a server computer, and an enterprise computer each in communication with one another via a network. According to such an embodiment, each one of the ally computers may be configured to receive a patron endorsement from one line to another line. Further, the server computer may be configured to index the patron endorsement into a first endorsement data set by a unique patron number associated with a patron name, a sending line, a receiving line; and a patron needs met indication. The server computer may be further configured to transform an enterprise patrons helped indication based on a total count of the patron needs met indication over a predetermined period.

According to another embodiment of the invention, the enterprise computer may include a graphical user interface program that, when executed by the enterprise computer, functions to depict a first graphical user interface on the display of the enterprise computer. The first graphical user interface may include a plurality of first graphical user interface images containing a plurality of data fields populatable with the sending line, a number of endorsements for the sending line, the patron needs met indication for the sending line, and a conversion rate for the sending line.

According to another embodiment of the invention, the graphical user interface program may function to depict a second graphical user interface on the display of the enterprise computer. The second graphical user interface may include a plurality of second graphical user interface images containing a plurality of data fields populatable with the receiving line, a number of endorsements for the receiving line, the patron needs met indication for the receiving line, and a conversion rate for the receiving line.

According to another embodiment of the invention, the graphical user interface program may function to depict a third graphical user interface on a display of the enterprise computer, the third graphical user interface including a plurality of third graphical user interface images containing a plurality of data fields populatable with the enterprise patrons helped indication, the predetermined time period, and a predetermined threshold value of enterprise patrons helped indications.

According to another embodiment of the invention, the receiving line may be one of the lines of the plurality of lines which receives the patron endorsement and wherein the sending line may be one of the lines of the plurality of lines which sent the patron endorsement to the receiving line.

According to another embodiment of the invention, the predetermined threshold value of enterprise patrons helped indications may be juxtaposed the enterprise patrons helped indication in the third graphical user interface.

According to another embodiment of the invention, the third graphical user interface may further include a graphical linear scale depicting the predetermined threshold value of enterprise patrons helped indications and the enterprise patrons helped indication for gauging an enterprise progress towards the predetermined threshold value of enterprise patrons helped indications.

According to another embodiment of the invention, the respective first and second graphical user interfaces each may include a pair of radio buttons, labeled sending line and receiving line, and wherein either radio button is selectable to toggle between respective first and second graphical user interfaces.

According to another embodiment of the invention, the conversion rate is the patron needs met indication divided by the total number of endorsements.

The features, functions, and advantages that have been discussed may be achieved independently in various embodiments of the present invention or may be combined in yet other embodiments, further details of which can be seen with reference to the following description and drawings.

BRIEF DESCRIPTION OF THE SEVERAL VIEWS OF THE DRA WINGS

Having thus described embodiments of the invention in general terms, reference will now be made to the accompanying drawings, wherein:

FIG. 2 is a flow chart illustrating endorsement of a patron by an ally from one line to another and the transformation of the endorsement data to at least three graphic ally interfaces;

FIG. 3 is an exemplary graphical user interface according to one embodiment;

FIG. 5 is an exemplary graphical user interface according to one embodiment;

FIG. 6 is an exemplary graphical user interface according to one embodiment;

FIG. 7 is an exemplary graphical user interface according to one embodiment;

FIG. 8 is an exemplary graphical user interface according to one embodiment;

FIG. 9 is an exemplary graphical user interface according to one embodiment;

FIG. 10 is an exemplary graphical user interface according to one embodiment;

DETAILED DESCRIPTION OF EMBODIMENTS OF THE INVENTION

Figure 1:
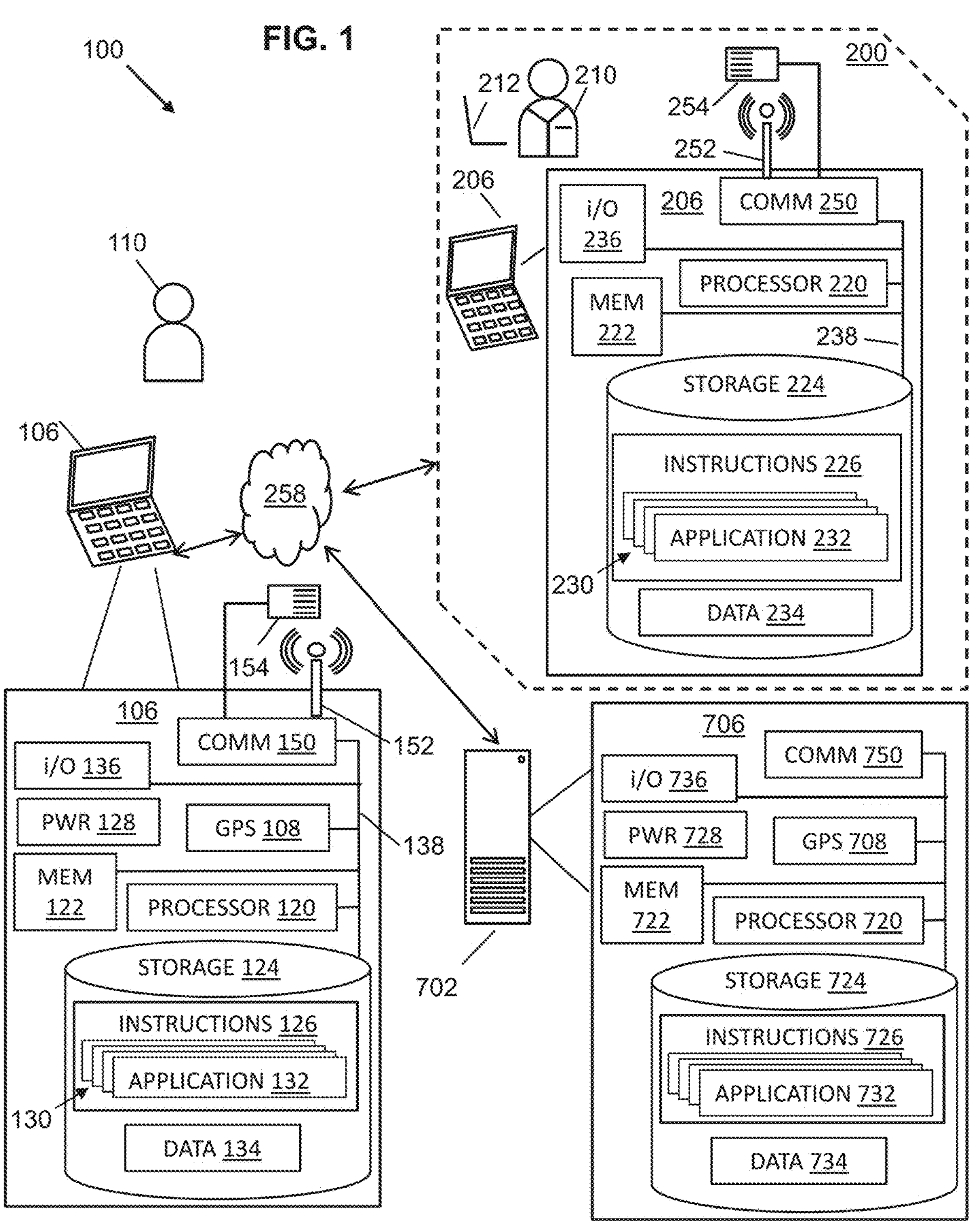
FIG. 1 illustrates an enterprise system, and environment thereof, according to at least one embodiment.

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout. Unless described or implied as exclusive alternatives, features throughout the drawings and descriptions should be taken as cumulative, such that features expressly associated with some particular embodiments can be combined with other embodiments. Unless defined otherwise, technical and scientific terms used herein have the same meaning as commonly understood to one of ordinary skill in the art to which the presently disclosed subject matter pertains.

The exemplary embodiments are provided so that this disclosure will be both thorough and complete, and will fully convey the scope of the invention and enable one of ordinary skill in the art to make, use, and practice the invention.

The terms "coupled," "fixed," "attached to," "communicatively coupled to," "operatively coupled to," and the like refer to both (i) direct connecting, coupling, fixing, attaching, communicatively coupling; and (ii) indirect connecting coupling, fixing, attaching, communicatively coupling via one or more intermediate components or features, unless otherwise specified herein. "Communicatively coupled to" and "operatively coupled to" can refer to physically and/or electrically related components.

Embodiments of the present invention described herein, with reference to flowchart illustrations and/or block diagrams of methods or apparatuses (the term "apparatus" includes systems and computer program products), will be understood such that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute via the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instructions, which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions, which execute on the computer or other programmable apparatus, provide steps for implementing the functions/acts specified in the flowchart and/or block diagram block or blocks. Alternatively, computer program implemented steps or acts may be combined with operator or human implemented steps or acts in order to carry out an embodiment of the invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the herein described embodiments can be configured without departing from the scope and spirit of the invention. Therefore, it is to be understood that, within the scope of the included claims, the invention may be practiced other than as specifically described herein.

FIG. 1 illustrates a system 100 and environment thereof, according to at least one embodiment, by which an allies 110 belonging to various lines endorse services and products to patrons who may be served by another ally belong to a different line such that one ally 110 in a first line is a sending ally and another ally 110 in a second line is a receiving ally who receives the endorsement from the sending ally. As used herein, a line is a line of business (LOB) that is part of an enterprise or organization. The enterprise may be a bank or other business organization. Examples of line in a banking enterprise include loans, investments, insurance, wealth, etc. . . .

The ally 110 accesses services and products by use of one or more ally devices 106. These ally devices 106 may be computing devices and/or a mobile device, which may include, as non-limiting examples, a smart phone, a portable digital assistant (PDA), a pager, a mobile television, a gaming device, a laptop computer, a camera, a video recorder, an audio/video player, radio, a GPS device, or any combination of the aforementioned, or other portable device with processing and communication capabilities. In the illustrated example, the ally device 106 can be, as non-limiting examples, a desktop computer, a laptop computer, or other ally-accessible computing device.

Furthermore, the ally device may be or include a workstation, a server, or any other suitable device, including a set of servers, a cloud-based application or system, or any other suitable system, adapted to execute, for example any suitable operating system, including Linux, UNIX, Windows, macOS, IOS, Android and any other known operating system used on personal computers, central computing systems, phones, and other devices.

The ally 110 can be an individual, a group, or any entity in possession of or having access to the ally device 106. Although the ally 110 may be singly represented in some drawings, at least in some embodiments according to these descriptions the ally 110 is one of many such that a market or community of allys, agents, consumers, customers, business entities, government entities, clubs, and groups of any size are all within the scope of these descriptions. According to at least one embodiment, an ally is a teammate or employee of an organization such as a bank. The ally may work with patrons of the organization or bank.

The ally device 106, includes components such as, at least one of each of a processing device 120, and a memory device 122 for processing use, such as random access memory (RAM), and read-only memory (ROM). The ally device 106 further includes a storage device 124 including at least one of a non-transitory storage medium, such as a microdrive, for long-term, intermediate-term, and short-term storage of computer-readable instructions 126 for execution by the processing device 120. For example, the instructions 126 can include instructions for an operating system and various applications or programs 130, of which the application 132 is represented as a particular example. The storage device 124 can store various other data items 134, which can include, as non-limiting examples, cached data, ally files such as those for pictures, audio and/or video recordings, files downloaded or received from other devices, and other data items preferred by the ally or required or related to any or all of the applications or programs 130.

The memory device 122 is operatively coupled to the processing device 120. As used herein, memory includes any computer readable medium to store data, code, or other information. The memory device 122 may include volatile memory, such as volatile Random Access Memory (RAM) including a cache area for the temporary storage of data. The memory device 122 may also include non-volatile memory, which can be embedded and/or may be removable. The non-volatile memory can additionally or alternatively include an electrically erasable programmable read-only memory (EEPROM), flash memory or the like.

The memory device 122 and storage device 124 can store any of a number of applications which comprise computer-executable instructions and code executed by the processing device 120 to implement the functions of the ally device 106 described herein. For example, the memory device 122 may include such applications as a conventional web browser application and/or a mobile P2P payment system client application. These applications also typically provide a graphical user interface (GUI) on the display 140 that allows the ally 110 to communicate with the ally device 106, and, for example a mobile banking system, and/or other devices or systems. In one embodiment, when the ally 110 decides to enroll in a mobile banking program, the ally 110 downloads or otherwise obtains the mobile banking system client application from a mobile banking system, for example enterprise system 200, or from a distinct application server. In other embodiments, the ally 110 interacts with a mobile banking system via a web browser application in addition to, or instead of, the mobile P2P payment system client application.

The processing device 120, and other processors described herein, generally include circuitry for implementing communication and/or logic functions of the mobile device 106. For example, the processing device 120 may include a digital signal processor, a microprocessor, and various analog to digital converters, digital to analog converters, and/or other support circuits. Control and signal processing functions of the mobile device 106 are allocated between these devices according to their respective capabilities. The processing device 120 thus may also include the functionality to encode and interleave messages and data prior to modulation and transmission. The processing device 120 can additionally include an internal data modem. Further, the processing device 120 may include functionality to operate one or more software programs, which may be stored in the memory device 122, or in the storage device 124. For example, the processing device 120 may be capable of operating a connectivity program, such as a web browser application. The web browser application may then allow the mobile device 106 to transmit and receive web content, such as, for example, location-based content and/or other web page content, according to a Wireless Application Protocol (WAP), Hypertext Transfer Protocol (HTTP), and/or the like.

The memory device 122 and storage device 124 can each also store any of a number of pieces of information, and data, used by the ally device and the applications and devices that facilitate functions of the ally device, or are in communication with the ally device, to implement the functions described herein and others not expressly described. For example, the storage device may include such data as ally authentication information, etc.

The processing device 120, in various examples, can operatively perform calculations, can process instructions for execution, and can manipulate information. The processing device 120 can execute machine-executable instructions stored in the storage device 124 and/or memory device 122 to thereby perform methods and functions as described or implied herein, for example by one or more corresponding flow charts expressly provided or implied as would be understood by one of ordinary skill in the art to which the subject matters of these descriptions pertain. The processing device 120 can be or can include, as non-limiting examples, a central processing unit (CPU), a microprocessor, a graphics processing unit (GPU), a microcontroller, an application-specific integrated circuit (ASIC), a programmable logic device (PLD), a digital signal processor (DSP), a field programmable gate array (FPGA), a state machine, a controller, gated or transistor logic, discrete physical hardware components, and combinations thereof. In some embodiments, particular portions or steps of methods and functions described herein are performed in whole or in part by way of the processing device 120, while in other embodiments methods and functions described herein include cloud-based computing in whole or in part such that the processing device 120 facilitates local operations including, as non-limiting examples, communication, data transfer, and ally inputs and outputs such as receiving commands from and providing displays to the ally.

The ally device 106, as illustrated, includes an input and output system 136, referring to, including, or operatively coupled with, ally input devices and ally output devices, which are operatively coupled to the processing device 120. The ally output devices include a display 140 (e.g., a liquid crystal display or the like), which can be, as a non-limiting example, a touch screen of the ally device 106, which serves both as an output device, by providing graphical and text indicia and presentations for viewing by one or more ally 110, and as an input device, by providing virtual buttons, selectable options, a virtual keyboard, and other indicia that, when touched, control the ally device 106 by ally action. The ally output devices include a speaker 144 or other audio device. The ally input devices, which allow the ally device 106 to receive data and actions such as button manipulations and touches from an ally such as the ally 110, may include any of a number of devices allowing the ally device 106 to receive data from an ally, such as a keypad, keyboard, touch-screen, touchpad, microphone 142, mouse, joystick, other pointer device, button, soft key, and/or other input device(s). The ally interface may also include a camera, such as a digital camera.

Further non-limiting examples include, one or more of each, any, and all of a wireless or wired keyboard, a mouse, a touchpad, a button, a switch, a light, an LED, a buzzer, a bell, a printer and/or other ally input devices and output devices for use by or communication with the ally 110 in accessing, using, and controlling, in whole or in part, the ally device, referring to either or both of the ally device 106. Inputs by one or more allies 110 can thus be made via voice, text or graphical indicia selections.

The ally device 106 may also include a positioning device (not shown), which can be for example a global positioning system device (GPS) configured to be used by a positioning system to determine a location of the ally device 106. For example, the positioning system device may include a GPS transceiver. In some embodiments, the positioning system device includes an antenna, transmitter, and receiver. For example, in one embodiment, triangulation of cellular signals may be used to identify the approximate location of the ally device 106. In other embodiments, the positioning device includes a proximity sensor or transmitter, such as an RFID tag, that can sense or be sensed by devices known to be located proximate a merchant or other location to determine that the consumer mobile device 106 is located proximate these known devices.

In the illustrated example, a system intraconnect 138, connects, for example electrically, the various described, illustrated, and implied components of the mobile device 106. The intraconnect 138, in various non-limiting examples, can include or represent, a system bus, a high-speed interface connecting the processing device 120 to the memory device 122, individual electrical connections among the components, and electrical conductive traces on a motherboard common to some or all of the above-described components of the ally device. As discussed herein, the system intraconnect 138 may operatively couple various components with one another, or in other words, electrically connects those components, either directly or indirectly—by way of intermediate component(s)—with one another.

The ally device 106, includes a communication interface 150, by which the ally device 106 communicates and conducts transactions with other devices and systems. The communication interface 150 may include digital signal processing circuitry and may provide two-way communications and data exchanges, for example wirelessly via wireless communication device 152, and for an additional or alternative example, via wired or docked communication by mechanical electrically conductive connector 154. Communications may be conducted via various modes or protocols, of which GSM voice calls, SMS, EMS, MMS messaging, TDMA, CDMA, PDC, WCDMA, CDMA2000, and GPRS, are all non-limiting and non-exclusive examples. Thus, communications can be conducted, for example, via the wireless communication device 152, which can be or include a radio-frequency transceiver, a Bluetooth device, Wi-Fi device, a Near-field communication device, and other transceivers. In addition, GPS (Global Positioning System) may be included for navigation and location-related data exchanges, ingoing and/or outgoing. Communications may also or alternatively be conducted via the connector 154 for wired connections such by USB, Ethernet, and other physically connected modes of data transfer.

The processing device 120 is configured to use the communication interface 150 as, for example, a network interface to communicate with one or more other devices on a network. In this regard, the communication interface 150 utilizes the wireless communication device 152 as an antenna operatively coupled to a transmitter and a receiver (together a "transceiver") included with the communication interface 150. The processing device 120 is configured to provide signals to and receive signals from the transmitter and receiver, respectively. The signals may include signaling information in accordance with the air interface standard of the applicable cellular system of a wireless telephone network. In this regard, the ally device 106 may be configured to operate with one or more air interface standards, communication protocols, modulation types, and access types. By way of illustration, the ally device 106 may be configured to operate in accordance with any of a number of first, second, third, fourth, fifth-generation communication protocols and/or the like. For example, the ally device 106 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols such as Long-Term Evolution (LTE), fifth-generation (5G) wireless communication protocols, Bluetooth Low Energy (BLE) communication protocols such as Bluetooth 5.0, ultra-wideband (UWB) communication protocols, and/or the like. The ally device 106 may also be configured to operate in accordance with non-cellular communication mechanisms, such as via a wireless local area network (WLAN) or other communication/data networks.

The communication interface 150 may also include a payment network interface. The payment network interface may include software, such as encryption software, and hardware, such as a modem, for communicating information to and/or from one or more devices on a network. For example, the mobile device 106 may be configured so that it can be used as a credit or debit card by, for example, wirelessly communicating account numbers or other authentication information to a terminal of the network. Such communication could be performed via transmission over a wireless communication protocol such as the Near-field communication protocol.

The ally device 106 further includes a power source 128, such as a battery, for powering various circuits and other devices that are used to operate the ally device 106. Embodiments of the ally device 106 may also include a clock or other timer configured to determine and, in some cases, communicate actual or relative time to the processing device 120 or one or more other devices. For further example, the clock may facilitate timestamping transmissions, receptions, and other data for security, authentication, logging, polling, data expiry, and forensic purposes.

System 100 as illustrated diagrammatically represents at least one example of a possible implementation, where alternatives, additions, and modifications are possible for performing some or all of the described methods, operations and functions. Although shown separately, in some embodiments, two or more systems, servers, or illustrated components may utilized. In some implementations, the functions of one or more systems, servers, or illustrated components may be provided by a single system or server. In some embodiments, the functions of one illustrated system or server may be provided by multiple systems, servers, or computing devices, including those physically located at a central facility, those logically local, and those located as remote with respect to each other.

The enterprise computing system 200 is designed to communicate with the ally devices 106 and the server computer system 706 via the network 258. The enterprise computing system 200 is designed to be accessible decisions makers in the enterprise. Such decision makers may include those responsible for reviewing the performance allies 110, those responsible for review lines, or those responsible for reviewing overall efficiency and productivity of the enterprise.

The lines represented by the allies can include any number or type of services and/or products to one or more. Use of "service(s)" or "product(s)" thus relates to either or both in these descriptions. With regard, for example, to online information and financial services, "service" and "product" are sometimes termed interchangeably. In non-limiting examples, services and products include retail services and products, information services and products, custom services and products, predefined or pre-offered services and products, consulting services and products, advising services and products, forecasting services and products, internet products and services, social media, and financial services and products, which may include, in non-limiting examples, services and products relating to banking, checking, savings, investments, credit cards, automatic-teller machines, debit cards, loans, mortgages, personal accounts, business accounts, account management, credit reporting, credit requests, and credit scores.

Decision makers 210 may utilize enterprise computing devices 212 to review allies, lines, and other subdivisions to communicate and take action. The enterprise computing devices 212 can be, as non-limiting examples, computing devices, kiosks, terminals, smart devices such as phones, and devices and tools at customer service counters and windows at POS locations. In at least one example, the diagrammatic representation of the components of the ally device 106 in FIG. 1 applies as well to one or both of the ally devices 106 and the enterprise computing devices 212.

Enterprise computing devices 212 individually or collectively include input devices and output devices, including, as non-limiting examples, a touch screen, which serves both as an output device by providing graphical and text indicia and presentations for viewing by one or more decision makers 210, and as an input device by providing virtual buttons, selectable options, a virtual keyboard, and other indicia that, when touched or activated, control or prompt the enterprise computing device 212 by action of the decision maker 210. Further non-limiting examples include, one or more of each, any, and all of a keyboard, a mouse, a touchpad, a joystick, a button, a switch, a light, an LED, a microphone serving as input device for example for voice input by a decision maker 210, a speaker serving as an output device, a camera serving as an input device, a buzzer, a bell, a printer and/or other ally input devices and output devices for use by or communication with a human agent 210 in accessing, using, and controlling, in whole or in part, the enterprise computing device 212.

Inputs by one or more decision makers 210 can thus be made via voice, text or graphical indicia selections. For example, some inputs received by an enterprise computing device 212 in some examples correspond to, control, or prompt enterprise-side actions and communications offering services and products of the enterprise system 200, information thereof, or access thereto. At least some outputs by an enterprise computing device 212 in some examples correspond to, or are prompted by ally actions and communications in two-way communications between an ally 110 and a second ally.

A computing system 206 of the enterprise system 200 may include components such as, at least one of each of a processing device 220, and a memory device 222 for processing use, such as random access memory (RAM), and read-only memory (ROM). The illustrated computing system 206 further includes a storage device 224 including at least one non-transitory storage medium, such as a microdrive, for long-term, intermediate-term, and short-term storage of computer-readable instructions 226 for execution by the processing device 220. For example, the instructions 226 can include instructions for an operating system and various applications or programs 230, of which the application 232 is represented as a particular example. The storage device 224 can store various other data 234, which can include, as non-limiting examples, cached data, and files such as those for ally accounts, ally profiles, account balances, and transaction histories, files downloaded or received from other devices, and other data items preferred by the ally or required or related to any or all of the applications or programs 230.

The computing system 206, in the illustrated example, includes an input/output system 236, referring to, including, or operatively coupled with input devices and output devices such as, in a non-limiting example, second ally devices 212, which have both input and output capabilities.

In the illustrated example, a system intraconnect 238 electrically connects the various above-described components of the computing system 206. In some cases, the intraconnect 238 operatively couples components to one another, which indicates that the components may be directly or indirectly connected, such as by way of one or more intermediate components. The intraconnect 238, in various non-limiting examples, can include or represent, a system bus, a high-speed interface connecting the processing device 220 to the memory device 222, individual electrical connections among the components, and electrical conductive traces on a motherboard common to some or all of the above-described components of the ally device.

The computing system 206, in the illustrated example, includes a communication interface 250, by which the computing system 206 communicates and conducts transactions with other devices and systems. The communication interface 250 may include digital signal processing circuitry and may provide two-way communications and data exchanges, for example wirelessly via wireless device 252, and for an additional or alternative example, via wired or docked communication by mechanical electrically conductive connector 254. Communications may be conducted via various modes or protocols, of which GSM voice calls, SMS, EMS, MMS messaging, TDMA, CDMA, PDC, WCDMA, CDMA2000, and GPRS, are all non-limiting and non-exclusive examples. Thus, communications can be conducted, for example, via the wireless device 252, which can be or include a radio-frequency transceiver, a Bluetooth device, Wi-Fi device, Near-field communication device, and other transceivers. In addition, GPS (Global Positioning System) may be included for navigation and location-related data exchanges, ingoing and/or outgoing. Communications may also or alternatively be conducted via the connector 254 for wired connections such as by USB, Ethernet, and other physically connected modes of data transfer.

The processing device 220, in various examples, can operatively perform calculations, can process instructions for execution, and can manipulate information. The processing device 220 can execute machine-executable instructions stored in the storage device 224 and/or memory device 222 to thereby perform methods and functions as described or implied herein, for example by one or more corresponding flow charts expressly provided or implied as would be understood by one of ordinary skill in the art to which the subjects matters of these descriptions pertain. The processing device 220 can be or can include, as non-limiting examples, a central processing unit (CPU), a microprocessor, a graphics processing unit (GPU), a microcontroller, an application-specific integrated circuit (ASIC), a programmable logic device (PLD), a digital signal processor (DSP), a field programmable gate array (FPGA), a state machine, a controller, gated or transistor logic, discrete physical hardware components, and combinations thereof.

Furthermore, the computing device 206, may be or include a workstation, a server, or any other suitable device, including a set of servers, a cloud-based application or system, or any other suitable system, adapted to execute, for example any suitable operating system, including Linux, UNIX, Windows, macOS, IOS, Android, and any known other operating system used on personal computer, central computing systems, phones, and other devices.

A server computer 706 may include components such as, at least one of each of a processing device 720, and a memory device 722 for processing use, such as random access memory (RAM), and read-only memory (ROM). The illustrated computing system 706 further includes a storage device 724 including at least one non-transitory storage medium, such as a microdrive, for long-term, intermediate-term, and short-term storage of computer-readable instructions 726 for execution by the processing device 720. For example, the instructions 726 can include instructions for an operating system and various applications or programs 730, of which the application 732 is represented as a particular example. The storage device 724 can store various other data 734, which can include, as non-limiting examples, cached data, and files such as those for ally accounts, ally profiles, account balances, and transaction histories, files downloaded or received from other devices, and other data items preferred by the ally or required or related to any or all of the applications or programs 730.

The server computer 706, in the illustrated example, includes an input/output system 736, referring to, including, or operatively coupled with input devices and output devices such as, in a non-limiting example, enterprise computing devices 212, which have both input and output capabilities.

In the illustrated example, a system intraconnect electrically connects the various above-described components of the server computer 706. In some cases, the intraconnect operatively couples components to one another, which indicates that the components may be directly or indirectly connected, such as by way of one or more intermediate components. The intraconnect, in various non-limiting examples, can include or represent, a system bus, a high-speed interface connecting the processing device 720 to the memory device 722, individual electrical connections among the components, and electrical conductive traces on a motherboard common to some or all of the above-described components of the ally device.

The server computer 706, in the illustrated example, includes a communication interface 750, by which the server computer 706 communicates and conducts transactions with other devices and systems. The communication interface 750 may include digital signal processing circuitry and may provide two-way communications and data exchanges, for example wirelessly via wireless device 752, and for an additional or alternative example, via wired or docked communication by mechanical electrically conductive connector 754. Communications may be conducted via various modes or protocols, of which GSM voice calls, SMS, EMS, MMS messaging, TDMA, CDMA, PDC, WCDMA, CDMA2000, and GPRS, are all non-limiting and non-exclusive examples. Thus, communications can be conducted, for example, via the wireless device 252, which can be or include a radio-frequency transceiver, a Bluetooth device, Wi-Fi device, Near-field communication device, and other transceivers. In addition, GPS (Global Positioning System) may be included for navigation and location-related data exchanges, ingoing and/or outgoing. Communications may also or alternatively be conducted via the connector 254 for wired connections such as by USB, Ethernet, and other physically connected modes of data transfer.

The processing device 720, in various examples, can operatively perform calculations, can process instructions for execution, and can manipulate information. The processing device 720 can execute machine-executable instructions stored in the storage device 724 and/or memory device 722 to thereby perform methods and functions as described or implied herein, for example by one or more corresponding flow charts expressly provided or implied as would be understood by one of ordinary skill in the art to which the subjects matters of these descriptions pertain. The processing device 720 can be or can include, as non-limiting examples, a central processing unit (CPU), a microprocessor, a graphics processing unit (GPU), a microcontroller, an application-specific integrated circuit (ASIC), a programmable logic device (PLD), a digital signal processor (DSP), a field programmable gate array (FPGA), a state machine, a controller, gated or transistor logic, discrete physical hardware components, and combinations thereof.

Furthermore, the server computer 706, may be or include a workstation, a server, or any other suitable device, including a set of servers, a cloud-based application or system, or any other suitable system, adapted to execute, for example any suitable operating system, including Linux, UNIX, Windows, macOS, IOS, Android, and any known other operating system used on personal computer, central computing systems, phones, and other devices.

The ally devices 106, the enterprise computing devices 212, and the computer server 706, are in communication through one or more networks, referenced as network 258 in FIG. 1.

Network 258 provides wireless or wired communications among the components of the system 100 and the environment thereof, including other devices local or remote to those illustrated, such as additional mobile devices, servers, and other devices communicatively coupled to network 258, including those not illustrated in FIG. 1. The network 258 is singly depicted for illustrative convenience, but may include more than one network without departing from the scope of these descriptions. In some embodiments, the network 258 may be or provide one or more cloud-based services or operations. The network 258 may be or include an enterprise or secured network, or may be implemented, at least in part, through one or more connections to the Internet. A portion of the network 258 may be a virtual private network (VPN) or an Intranet. The network 258 can include wired and wireless links, including, as non-limiting examples, 802.11a/b/g/n/ac, 802.20, WiMax, LTE, and/or any other wireless link. The network 258 may include any internal or external network, networks, sub-network, and combinations of such operable to implement communications between various computing components within and beyond the illustrated environment 100. The network 258 may communicate, for example, Internet Protocol (IP) packets, Frame Relay frames, Asynchronous Transfer Mode (ATM) cells, voice, video, data, and other suitable information between network addresses. The network 258 may also include one or more local area networks (LANs), radio access networks (RANs), metropolitan area networks (MANs), wide area networks (WANs), all or a portion of the internet and/or any other communication system or systems at one or more locations.

In certain embodiments, one or more of the systems such as the ally device 106, the enterprise system 200, and/or the server computer 706 are, include, or utilize virtual resources. In some cases, such virtual resources are considered cloud resources or virtual machines. Such virtual resources may be available for shared use among multiple distinct resource consumers and in certain implementations, virtual resources do not necessarily correspond to one or more specific pieces of hardware, but rather to a collection of pieces of hardware operatively coupled within a cloud computing configuration so that the resources may be shared as needed.

Referring now to FIG. 2, according to one aspect of one embodiment of the invention, in a first step 802, a first ally who is associated with a first line may interact with a patron (not shown) and make an endorsement for the patron to a second line managed by a second ally. By way of a non-limiting example, the first ally may be investment banker in an investment line, the patron may be a customer, and the second line may be insurance such that the first ally has endorsed or referred the patron from the investment line to the insurance line.

In a second step 804, the second ally in the second line has helped the patron with the service/product offered by the second line. As used herein, help or helped means that the patron has purchased, adopted, or otherwise subscribed to the product/service offered by the second line.

In a third step 806, the server computer indexes and stores the data set surrounding the endorsement made by the first ally in the first step and the help given by the second ally of the second line in the second step. These first, second, and third steps are repeated 807 such that a database of endorsement data sets is stored in the memory of the server computer.

In a fourth step 808, the server computer transforms the endorsement data set into an enterprise patrons needs met indication. In at least one embodiment, the enterprise patrons needs met indication is an accounting of all endorsements at the enterprise level where the patron endorsement was (i) qualified and (2) successful. As used herein, qualified means that the patron that was endorsed by the first/sending line was qualified for the product/service offered by the second line. As used herein, successful means that the patron who received the endorsement and was qualified actually purchased, agreed, or otherwise acceded to the product offered by the second/receiving line. Accordingly, the enterprise patrons needs met indication transcends all lines and is not a mere counting of all endorsements. Nor is it an accounting of discrete patrons who were helped. Rather, the enterprise patrons needs met indication is a unique number that represents gross number of times patrons have been endorsed to another line and subsequently helped by another line.

In an alternate fourth step (not shown), the server computer transforms the endorsement data set into an enterprise patrons helped indication. In at least one embodiment of this alternate fourth step, the enterprise patrons helped indication is an accounting of all endorsements on a patron-by-patron level. That is, according to this alternate fourth step, it is not a counting of all endorsements. Nor is it an accounting of how many times a patron has been helped by an ally. Rather, the enterprise patrons helped indication is a unique number that represents how many patrons have been endorsed to another line and subsequently helped by another line at least one time. Accordingly, according to this alternate fourth step, no patron is counted more than once and no endorsement is counted more than once.

In a fifth step 810, an enterprise computer receives the endorsement data set and the enterprise patrons needs met indication from the server computer. The enterprise computer executes a graphical user interface (GUI) program that optionally depicts one of at least three GUIS.

Further, as shown at reference numeral 812, the GUI program causes the depiction of a first GUI on the display which includes a plurality of first graphical user interface images containing a plurality of data fields populatable with the sending line, the number of endorsements for the sending line, the patron needs met indication for the sending line, and a conversion rate for the sending line. In this way, the first GUI is programed to report from a unique perspective that causes the sending line specific data to be graphically presented. This first GUI may be useful reviewing line specific sending performance.

Further, as shown at reference numeral 814, the GUI program causes the depiction of a second GUI on the display which includes a plurality of second graphical user interface images containing a plurality of data fields populatable with the receiving line, the number of referrals for the receiving line, the patron needs met indication for the receiving line, and a conversion rate for the receiving line. In this way, the second GUI is programed to report from a unique perspective that causes the sending line specific data to be graphically presented. This first GUI may be useful in reviewing line specific receiving performance.

Further, as shown at reference numeral 816, the GUI program causes the depiction of a third GUI on the display which includes a plurality of third graphical user interface images containing a plurality of data fields populatable with the enterprise patrons needs met indication and the predetermined time period. In this way, the third GUI is programed to report from a unique perspective that causes the enterprise patrons needs met indication across the predetermined time period. This third GUI may be useful in reviewing enterprise performance.

Embodiments showing exemplary GUIs with specificity according to the present invention are illustrated in FIGS. 3-12. Note that the data/numbers shown in FIGS. 3-12 is for illustration purposes only and is not necessarily functional or operative or otherwise based on any actual implementations. In particular, FIG. 3 shows an embodiment from a unique perspective that causes the sending line specific data to be graphically presented in respective data fields. As shown, the term LOB refers to the specific lines 300 within the enterprise. As shown, radio icon sending LOB 301 is selected, requiring that sending lines are depicted in respective data fields. Among the data fields for the sending lines further includes, for respective lines 300, the total number of endorsements 302, the number of endorsement that proved to be qualified 304, the number of endorsements that proved to be not qualified 306, the number of endorsements which had not yet been processed 308, the percentage of endorsements that proved to be qualified 310, the number of endorsements that opportunities 312, the percentage of endorsement opportunities divided by the number of qualified opportunities expressed as a opportunities rate 314, the patron needs met number 316, the patron needs met rate 318 which equates to the number of patron needs met divided by the number of opportunities, and the conversion rate 320 which equates to the patron needs met number divided by the number of endorsements.

Also shown in FIG. 3 is the GUI depiction in the respective field for the enterprise patrons helped indication 324. In GUI 330, depicted is the predetermined threshold value of enterprise patrons helped indications 326 is juxtaposed the enterprise patrons helped indication 324. As shown, the GUI includes a linear chart depicting the level of the enterprise patrons helped indications 324 as a distance from the predetermined threshold 326. One will note that while the enterprise patrons helped indication 324 is shown as below the predetermined threshold 326, the value may also, depending on various circumstances, be a distance above the predetermined threshold.

The GUI shown in FIG. 3 also includes a summary bar across the top portion wherein the enterprise level figures for endorsements, qualified endorsements, opportunities, patron needs met, and enterprise patrons helped are shown. With respect to the latter enterprise patrons helped, the display shows the patrons helped in during the predetermined time period, shown as the year 2022 in FIG. 3.

Figure 4:
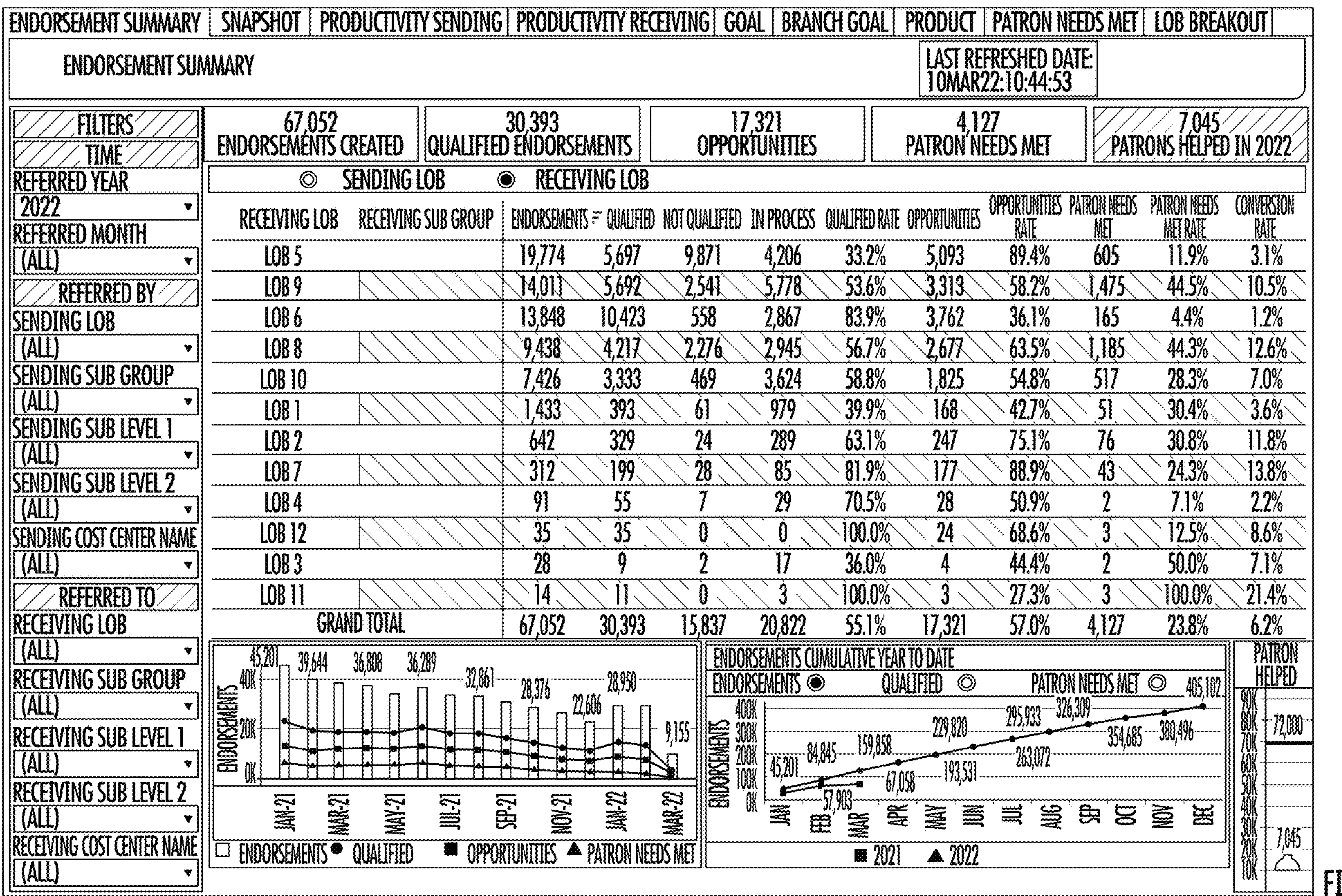
FIG. 4 is an exemplary graphical user interface according to one embodiment.

FIG. 4 shows an embodiment from a unique perspective that causes the receiving line specific data to be graphically presented in respective data fields. As shown, the term LOB refers to the specific lines 300 within the enterprise. As shown, radio icon sending LOB 303 is selected, requiring that sending lines are depicted in respective data fields. Among the data fields for the sending lines further includes, for respective lines 300, the total number of endorsements 302, the number of endorsement that proved to be qualified 304, the number of endorsements that proved to be not qualified 306, the number of endorsements which had not yet been processed 308, the percentage of endorsements that proved to be qualified 310, the number of endorsements that opportunities 312, the percentage of endorsement opportunities divided by the number of qualified opportunities expressed as a opportunities rate 314, the patron needs met number 316, the patron needs met rate 318 which equates to the number of patron needs met divided by the number of opportunities, and the conversion rate 320 which equates to the patron needs met number divided by the number of endorsements.

Also shown in FIG. 4 is the GUI depiction in the respective field for the enterprise patrons helped indication 324. In GUI 330, depicted is the predetermined threshold value of enterprise patrons helped indications 326 is juxtaposed the enterprise patrons helped indication 324. As shown, the GUI includes a linear chart depicting the level of the enterprise patrons helped indications 324 as a distance from the predetermined threshold 326. One will note that while the enterprise patrons helped indication 324 is shown as below the predetermined threshold 326, the value may also, depending on various circumstances, be a distance above the predetermined threshold.

The GUI shown in FIG. 4 also includes a summary bar across the top portion wherein the enterprise level figures for endorsements, qualified endorsements, opportunities, patron needs met, and enterprise patrons helped are shown. With respect to the latter enterprise patrons helped, the display shows the patrons helped in during the predetermined time period, shown as the year 2022 in FIG. 4.

FIG. 5 shows a GUI depicting a snapshot of all endorsements across the enterprise with further data sets including in process data. Such in process data is depicted both by gross endorsement data, days in process, and pie charts showing endorsements by status and endorsements by in process days.

FIG. 6 shows a GUI depicting enterprise productivity based on sending lines. The data depicted in the GUI of FIG. 6 further shows individual ally data based on the individual allies who sent the endorsements. According to one embodiment of the present invention, endorsement sending data, including total endorsements, qualified endorsements, and patrons needs met data may be utilized in ally reviews and ally compensation reviews.

FIG. 7 shows a GUI depicting enterprise productivity based on receiving lines. The data depicted in the GUI of FIG. 6 further shows individual ally data based on the individual allies who received the endorsements. According to one embodiment of the present invention, endorsement receiving data, including total endorsements, qualified endorsements, and patrons needs met data may be utilized in ally reviews and ally compensation reviews.

FIG. 8 shows a GUI depicting line specific endorsement goals data including actual endorsements made across the line, a predetermined goal for line specific endorsements, and a percentage indication respective of the performance to predetermined goal for line specific endorsements.

FIG. 9 shows a GUI depicting branch specific goals. A branch is a business entity that is below the line level and above the individual ally level. Branches are also referred to as sub groups. The GUI accordingly depicts actual endorsements made across the branch, a predetermined goal for branch specific endorsements, and a percentage indication respective of the performance to predetermined goal for branch specific endorsements.

FIG. 10 shows a GUI with product specific goals. Products are individual services/products offered by lines. The GUI accordingly depicts endorsements made with respect to the product, the number of endorsements which were qualified, the number of opportunities, and the patron needs met for each product.

Figure 11:
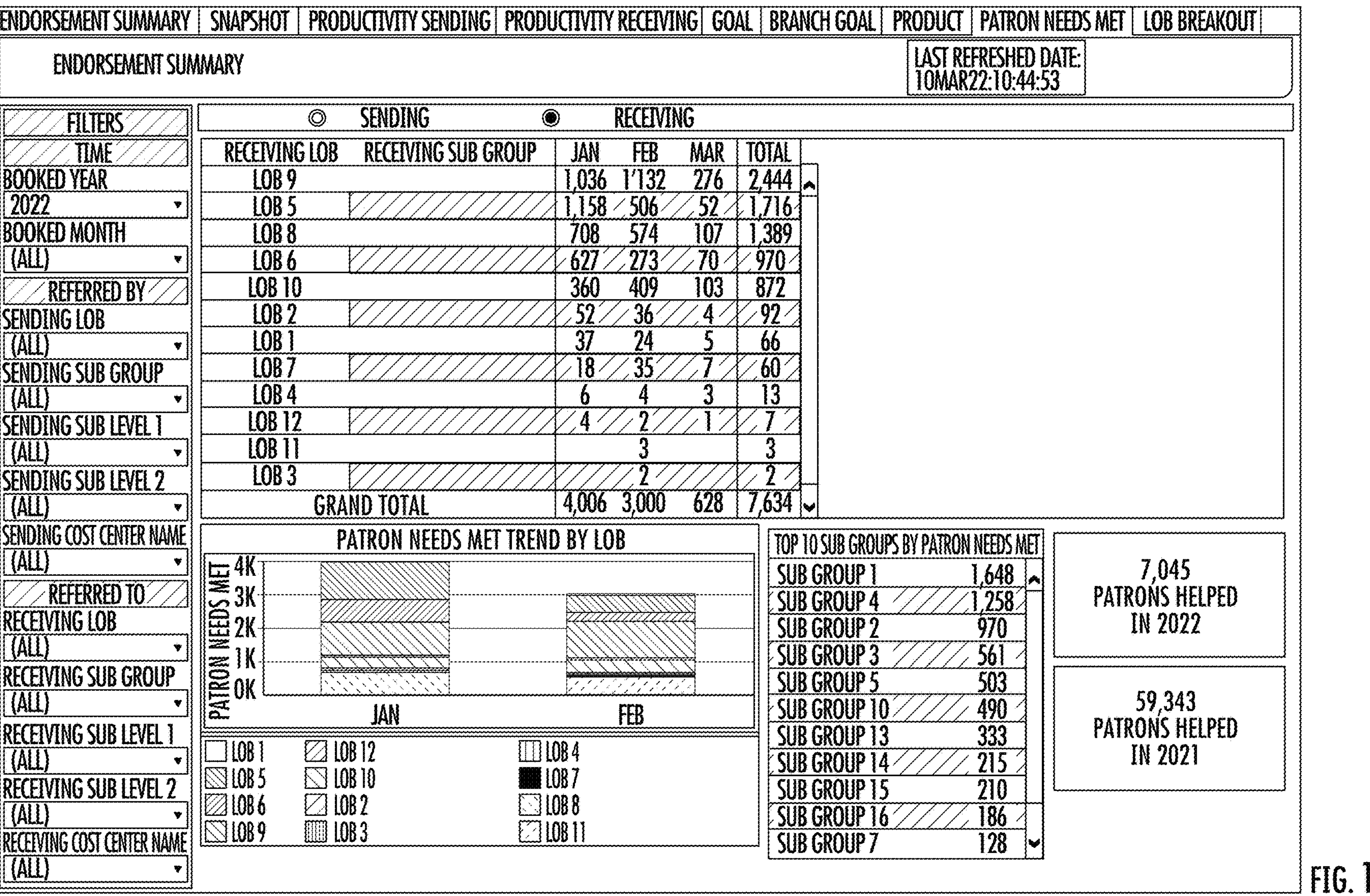
FIG. 11 is an exemplary graphical user interface according to one embodiment.

FIG. 11 shows a GUI with patron needs met data graphically displayed. The patron needs met data is selectively broken down by either sending line or receiving line. The GUI includes a radio button which may be used to toggle between sending and receiving lines. The data may also be broken down by month and total for the predetermined period. The GUI shown in FIG. 11 further utilizes a graphical chart for help in visualizing trends in client needs met by line. The GUI also offers a ranking of top branches/subgroups by total number of patron needs met during the predetermined period. Further, the GUI includes a graphic visualizing the total of the patrons helped in the predetermined period and a comparison to the total patrons helped in prior predetermined periods.

Figure 12:
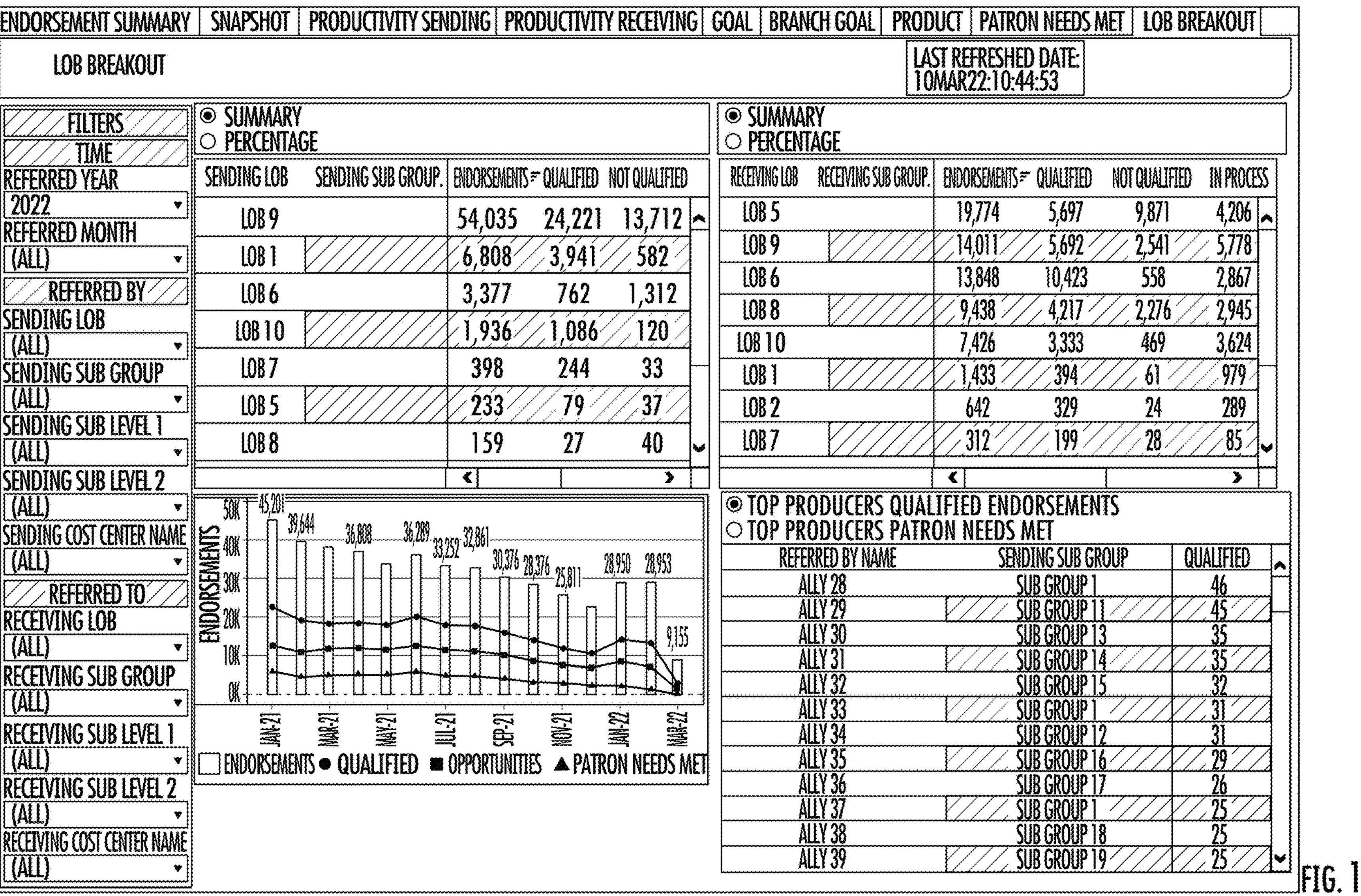
FIG. 12 is an exemplary graphical user interface according to one embodiment.

FIG. 12 shows a GUI with specific line breakouts. In particular, both sending and receiving lines are shown in data fields paralleling total endorsements, qualified endorsements, and non-qualified endorsements. Such data is transformed into a line graph depicting endorsements, qualified endorsements, opportunities', and patron needs met on a predetermined sub-period basis (shown as monthly). Top performing allies are also shown together with their branch (sub-group) and the total of qualified endorsements per individual ally.

Particular embodiments and features have been described with reference to the drawings. It is to be understood that these descriptions are not limited to any single embodiment or any particular set of features. Similar embodiments and features may arise or modifications and additions may be made without departing from the scope of these descriptions and the spirit of the appended claims.

What is claimed is:

1. A computer system for processing data, data tracking, and depicting graphical user interfaces incorporating the data, the system comprising:

a plurality of ally computers, each ally computer of the plurality of ally computers associated with a first line of business (LOB) of an enterprise, and each ally computer having a memory device storing computer-readable program code, a communication device, and a processing device operatively coupled to the memory device and to the communication device, wherein the processing device is configured to execute the computer-readable code to:

receive a first data input from an ally computer of the plurality of ally computers, the first data input comprising a first patron endorsement that is initiated from the first LOB endorsing a second LOB of the enterprise;

transmit via a communication interface of the communication device in communication with a network the first data input to one or more computing devices associated with the second LOB; and receive a transmission input associated with a second patron endorsement from a line that is distinct from the first LOB;

a server computer having a memory device storing computer-readable program code, a communication device in communication with the network, and a processing device operatively coupled to the memory device and to the communication device, wherein the processing device is configured to execute the computer-readable code to:

process and convert the first data input into a standardized first data set that facilitates improvement in data analysis through a centralized data source, the first data set including (i) information about a patron associated with the first input, (ii) an identifier of the first LOB sending the first data input, (iii) an indication the second LOB received the first data input; and (iv) a first indication indicating whether needs of a human ally that assisted the patron were satisfied;

store in the memory device of the server computer the first data set; and generate a second data set that further facilitates the improvement in data analysis through the centralized data source, the second data set comprising: (i) a second indication based on both the first LOB being a sending LOB and the second LOB being a receiving LOB, the second indication indicating a patron was qualified and successfully acceded one or more objects available through the receiving LOB; and (ii) a conversion rate for each receiving LOB and each sending LOB based on the first indication and based on a number of endorsements for each receiving LOB and each sending LOB over a predetermined period;

an enterprise computer of the enterprise, the enterprise computer having a memory device storing computer-readable program code, a communication device in communication with the network, a processing device operatively coupled to the memory device and to the communication device, a display; and a graphical user interface program configured to improve enterprise-level data representation that when executed by the enterprise computer functions to generate and depict, on the display of the enterprise computer, at least one of:

a first graphical user interface including a plurality of first graphical user interface images facilitating tracking LOB data of the sending LOB that include: a) a plurality of data fields associated with the sending LOB, b) the number of endorsements for the sending LOB, c) a qualified rate for the sending LOB indicating a quantity of qualified patrons, d) the first indication for the sending LOB, e) the conversion rate for the sending LOB, and f) a first radio button labeled sending LOB and a second radio button labeled receiving LOB, wherein selection of the second radio button toggles the display from the first graphical user interface to a second graphical user interface;

the second graphical user interface including a plurality of second graphical user interface images facilitating tracking LOB data of the receiving LOB that include: a) a plurality of data fields associated with the receiving LOB, b) the number of endorsements for the receiving LOB, c) a qualified rate for the receiving LOB, d) the first indication for the receiving LOB, e) the conversion rate for the receiving LOB, and f) wherein selection of the first radio button toggles the display from the second graphical user interface to the first graphical user interface; and a third graphical user interface including a plurality of third graphical user interface images facilitating tracking progress data that include: a) a plurality of data fields associated with the second indication b) a predetermined time period, c) a predetermined threshold value of the second indication, and d) a graphical linear scale visually depicting both the predetermined threshold value and the second indication in juxtaposition for gauging enterprise progress towards the predetermined threshold value.

2. The system of claim 1, wherein the plurality of data fields associated with the sending LOB include an indication of a number of qualified endorsements that qualified to receive the one or more objects, where the one or more objects include one or more products or services.

3. The system of claim 1, wherein the plurality of data fields associated with the sending LOB include an indication of a number of non-qualified endorsements that were unqualified to receive the one or more objects, where the one or more objects include one or more products or services.

4. The system of claim 1, wherein the respective first and second graphical user interfaces each visually depict the first radio button and the second radio button, and wherein either radio button is selectable to toggle between the first and the second graphical user interfaces.

5. The system of claim 1, wherein the conversion rate is the first indication divided by the number of endorsements.

6. The system of claim 1, wherein the predetermined period is one year.

7. The system of claim 1, wherein the predetermined period is one month.

8. A computer system for processing data, data tracking, and depicting graphical user interfaces incorporating the data, the system comprising:

a plurality of ally computers, each ally computer of the plurality of ally computers associated with a first line of business (LOB) of an enterprise, each ally computer of the plurality of ally computers including a processor configured to receive a first data input from an individual associated with the first LOB and to transmit, via a network, the first data input to a second LOB, the first data input endorsing the second LOB;

a server computer operably connected to the plurality of ally computers via the network and having a memory device and a processing device, wherein the processing device is configured to execute the computer-readable code to:

process and convert the first data input into a standardized first data set that facilitates improvement in data analysis through a centralized data source, the first data set including: (i) a patron identifier, (ii) a sending LOB associated with the first LOB, (iii) a receiving LOB associated with the second LOB; and (iv) a first indication indicating whether needs of a patron identified via the patron identifier were satisfied;

store, in the memory device of the server computer, the first data set; and generate a second data set that further facilitates the improvement in data analysis through the centralized data source, the second data set comprising: (i) a second indication based on both the sending LOB and the receiving LOB as indexed in the first data set, the second indication indicating a prospective patron was qualified and that the prospective patron successfully acceded one or more objects available through the receiving LOB; and (ii) a conversion rate for each receiving LOB and each sending LOB based on the first indication and based on a number of endorsements for each receiving LOB and each sending LOB over a predetermined period;

an enterprise computer of the enterprise operably connected to the server computer and having a processing device and a display; and a graphical user interface program configured to improve enterprise-level data representation that when executed by the enterprise computer functions to generate and depict, on the display of the enterprise computer, at least one of:

a first graphical user interface including a plurality of first graphical user interface images facilitating tracking LOB data of the sending LOB that include: a) a plurality of data fields associated with the sending LOB, b) the number of endorsements for the sending LOB, c) a qualified rate for the sending LOB indicating a quantity of qualified patrons, d) the first indication for the sending LOB, e) the conversion rate for the sending LOB, and f) a first radio button labeled sending LOB and a second radio button labeled receiving LOB, wherein selection of the second radio button toggles the display from the first graphical user interface to a second graphical user interface;

the second graphical user interface including a plurality of second graphical user interface images facilitating tracking LOB data of the receiving LOB that include: a) a plurality of data fields associated with the receiving LOB, b) the number of endorsements for the receiving LOB, c) a qualified rate for the receiving LOB, d) the first indication for the receiving LOB, e) the conversion rate for the receiving LOB, and f) wherein selection of the first radio button toggles the display from the second graphical user interface to the first graphical user interface; and a third graphical user interface including a plurality of third graphical user interface images facilitating tracking progress data that include: a) a plurality of data fields associated with the second indication, b) a predetermined time period, c) a predetermined threshold value of the second indication, and d) a graphical linear scale visually depicting both the predetermined threshold value and the second indication in juxtaposition for gauging enterprise progress towards the predetermined threshold value.

9. The system of claim 8 wherein the plurality of data fields associated with the sending LOB include an indication of a number of qualified endorsements that qualified to receive the one or more objects, where the one or more objects include one or more products or services.

10. The system of claim 9 wherein the plurality of data fields associated with the sending LOB include an indication of a number of non-qualified endorsements that were unqualified to receive the one or more objects, where the one or more objects include one or more products or services.

11. The system of claim 8 wherein the respective first and second graphical user interfaces each visually depict the first radio button and the second radio button, and wherein either radio button is selectable to toggle between the first and the second graphical user interfaces.

12. The system of claim 8 wherein the conversion rate is the first indication divided by the number of endorsements.

13. The system of claim 8 wherein the predetermined period is one year.

14. The system of claim 8 wherein the predetermined period is one month.

15. A computing system for processing data, data tracking, and depicting graphical user interfaces incorporating the data, the system comprising:

a plurality of ally computers, a server computer, and an enterprise computer each in communication with one another via a network;

wherein each one of the ally computers is configured to receive a first input from a first line of business of an enterprise to a second line of business of the enterprise;

wherein the server computer is configured to:

process and convert the first input into a standardized first data set that facilitates improvement in data analysis through a centralized data source, the first data set including: (i) patron identification information, (ii) a sending line associated with the first line of business, (iii) a receiving line associated with the second line of business; and (iv) a first indication indicating whether needs of a patron associated with the patron identification information were satisfied; and generate a second data set that further facilitates the improvement in data analysis through the centralized data source, the second data set comprising: (i) a second indication based on both the sending line and the receiving line as indexed in the first data set, the second indication indicating a prospective patron was qualified and that the prospective patron successfully acceded one or more objects available through the receiving line; and (ii) a conversion rate for the receiving line and the sending line based on the first indication and based on a number of endorsements for the receiving line and the sending line over a predetermined period; and wherein the enterprise computer comprises a graphical user interface program configured to improve enterprise-level data representation that, when executed by the enterprise computer, functions to generate and depict, on the display of the enterprise computer, at least one of:

a first graphical user interface including a plurality of first graphical user interface images facilitate tracking of line of business (LOB) data of the sending line that include: a) a plurality of data fields associated with the sending line, b) a representation of the number of endorsements for the sending line, c) a representation of a qualified rate for the sending line, d) the first indication for the sending line, e) the conversion rate for the sending line, and f) a first radio button labeled sending line and a second radio button labeled receiving line, wherein selection of the second radio button toggles the display from the first graphical user interface to a second graphical user interface;

a second graphical user interface including a plurality of second graphical user interface images facilitating tracking LOB data of the receiving line that include: a) a plurality of data fields associated with the receiving line, b) a representation of the number of endorsements for the receiving line, c) a representation of a qualified rate for the receiving line, d) the first indication for the receiving line, e) the conversion rate for the receiving line, and f) wherein selection of the first radio button toggles the display from the second graphical user interface to the first graphical user interface; and a third graphical user interface including a plurality of third graphical user interface images facilitating tracking progress data that include: a) a plurality of data fields associated with the second indication, b) a predetermined time period, c) a predetermined threshold value of the second indication, and d) a graphical linear scale visually depicting both the predetermined threshold value and the second indication in juxtaposition for gauging enterprise progress towards the predetermined threshold value.

16. The system of claim 15, wherein the plurality of data fields include an indication of a number of qualified endorsements that qualified to receive the one or more objects, where the one or more objects include one or more products or service s.

17. The system of claim 16, wherein the plurality of data fields further include a number of non-qualified endorsements that were unqualified to receive the one or more objects, where the one or more objects include one or more products or services.

18. The system of claim 15, wherein the respective first and second graphical user interfaces each visually depict the first radio button and the second radio button, and wherein either radio button is selectable to toggle between the respective first and second graphical user interfaces.

19. The system of claim 15, wherein the conversion rate is the first indication divided by the total number of endorsements.

* * * * *